US008671135B1

(12) United States Patent
Joshi et al.

(10) Patent No.: US 8,671,135 B1
(45) Date of Patent: Mar. 11, 2014

(54) FLEXIBLE MECHANISM FOR IMPLEMENTING THE MIDDLEWARE OF A DATA DISTRIBUTION SYSTEM OVER MULTIPLE TRANSPORT NETWORKS

(75) Inventors: Rajive Joshi, San Jose, CA (US); Henry Choi, Cupertino, CA (US); Gerardo Pardo-Castellote, Palo Alto, CA (US); Stefaan Sonck Thiebaut, Berlin (DE)

(73) Assignee: Real-Time Innovations, Inc., Sunnyvale, CA (US)

( * ) Notice: Subject to any disclaimer, the term of this patent is extended or adjusted under 35 U.S.C. 154(b) by 1305 days.

(21) Appl. No.: 11/410,511

(22) Filed: Apr. 24, 2006
(Under 37 CFR 1.47)

(51) Int. Cl.
*G06F 15/16* (2006.01)
(52) U.S. Cl.
USPC . 709/202; 707/790; 707/999.2; 707/999.103; 707/E17.005; 707/999.002; 707/999.1; 707/999.004; 707/999.003; 718/102; 718/104; 717/151; 717/162; 717/103; 717/177; 379/88.17; 379/201.03; 379/10.03; 379/900; 709/238; 709/217; 709/246; 709/203; 709/220; 709/208; 709/227; 709/230; 719/328; 719/316; 719/331; 365/200; 726/12; 370/465; 370/469; 370/535; 370/329; 455/410

(58) Field of Classification Search
USPC .......................................................... 709/202
See application file for complete search history.

(56) References Cited

U.S. PATENT DOCUMENTS

| | | | |
|---|---|---|---|
| 4,484,294 A | 11/1984 | Noss | |
| 4,568,866 A | 2/1986 | Floro et al. | |
| 4,796,179 A | 1/1989 | Lehman et al. | |
| 5,055,755 A | 10/1991 | Ozawa et al. | |
| 5,086,385 A | 2/1992 | Launey et al. | |
| 5,404,288 A | 4/1995 | McDunn | |
| 5,546,301 A | 8/1996 | Agrawal et al. | |
| 5,668,998 A * | 9/1997 | Mason et al. | 717/104 |
| 5,838,563 A | 11/1998 | Dove et al. | |
| 5,940,827 A | 8/1999 | Hapner et al. | |
| 5,971,581 A | 10/1999 | Gretta et al. | |
| 6,026,352 A | 2/2000 | Burns et al. | |
| 6,058,445 A | 5/2000 | Chari et al. | |
| 6,076,952 A | 6/2000 | Gretta et al. | |
| 6,101,419 A * | 8/2000 | Kennedy et al. | 700/3 |
| 6,106,569 A | 8/2000 | Bohrer et al. | |
| 6,119,125 A | 9/2000 | Gloudeman et al. | |
| 6,134,706 A | 10/2000 | Carey et al. | |
| 6,154,680 A | 11/2000 | White et al. | |
| 6,195,591 B1 | 2/2001 | Nixon et al. | |
| 6,226,788 B1 | 5/2001 | Schoening et al. | |
| 6,226,792 B1 | 5/2001 | Goiffon et al. | |
| 6,259,958 B1 | 7/2001 | Steinman et al. | |

(Continued)

OTHER PUBLICATIONS

Milojicic et al., "Peer-to-Peer Computing", Hewlett-Packard Company, 2002.*

(Continued)

*Primary Examiner* — Krista M. Zele
*Assistant Examiner* — Ondrej Vostal
(74) *Attorney, Agent, or Firm* — Beyer Law Group LLP

(57) ABSTRACT

A method of providing transports for a data distribution middleware over a plurality of transport networks is provided. A data distribution middleware with a pluggable transport layer is provided. A plurality of transport plugins in the transport layer are provided. Aliases are assigned to each of the transport plugins of the plurality of transport plugins, wherein at least one of the transport plugins of the plurality of transport plugins has a plurality of aliases.

44 Claims, 14 Drawing Sheets

(56) References Cited

U.S. PATENT DOCUMENTS

| | | | |
|---|---|---|---|
| 6,269,396 B1 | 7/2001 | Shah et al. | |
| 6,425,119 B1 | 7/2002 | Jones et al. | |
| 6,477,439 B1 | 11/2002 | Bernaden, III et al. | |
| 6,493,740 B1 | 12/2002 | Lomax | |
| 6,725,446 B1 | 4/2004 | Hahn et al. | |
| 6,728,267 B1* | 4/2004 | Giese et al. | 370/469 |
| 6,751,663 B1 | 6/2004 | Farrell et al. | |
| 6,757,720 B1* | 6/2004 | Weschler, Jr. | 709/220 |
| 7,117,245 B1* | 10/2006 | Levkoff et al. | 709/206 |
| 7,123,142 B2* | 10/2006 | Bohbot et al. | 340/539.14 |
| 7,353,279 B2* | 4/2008 | Durvasula et al. | 709/227 |
| 7,424,549 B2* | 9/2008 | Beckwith | 709/238 |
| 7,827,559 B1* | 11/2010 | Rhee et al. | 718/104 |
| 8,489,742 B2* | 7/2013 | Clubb et al. | 709/226 |
| 2002/0101860 A1* | 8/2002 | Thornton et al. | 370/352 |
| 2002/0145924 A1* | 10/2002 | Beckwith | 365/200 |
| 2003/0005117 A1* | 1/2003 | Kang et al. | 709/225 |
| 2003/0037177 A1* | 2/2003 | Sutton et al. | 709/316 |
| 2003/0105800 A1* | 6/2003 | Cullen | 709/201 |
| 2003/0135644 A1* | 7/2003 | Barrett | 709/238 |
| 2003/0195959 A1* | 10/2003 | Labadie et al. | 709/224 |
| 2003/0200315 A1* | 10/2003 | Goldenberg et al. | 709/225 |
| 2003/0229786 A1* | 12/2003 | Hollis et al. | 713/168 |
| 2003/0229900 A1* | 12/2003 | Reisman | 725/87 |
| 2004/0024943 A1* | 2/2004 | Lupien et al. | 710/305 |
| 2004/0059819 A1* | 3/2004 | Hardcastle | 709/227 |
| 2004/0060055 A1* | 3/2004 | Kukura et al. | 719/316 |
| 2004/0064553 A1 | 4/2004 | Kjellberg | |
| 2004/0111517 A1* | 6/2004 | Aggarwal et al. | 709/227 |
| 2004/0205206 A1* | 10/2004 | Naik et al. | 709/230 |
| 2005/0027870 A1* | 2/2005 | Trebes | 709/227 |
| 2005/0049934 A1* | 3/2005 | Nakayama et al. | 705/26 |
| 2005/0053060 A1* | 3/2005 | Pettey | 370/385 |
| 2005/0218739 A1* | 10/2005 | Maddin et al. | 310/120 |
| 2006/0002388 A1* | 1/2006 | Grebus et al. | 370/389 |
| 2006/0085517 A1* | 4/2006 | Kaurila | 709/217 |
| 2006/0095765 A1* | 5/2006 | Pessach | 713/168 |
| 2006/0133313 A1* | 6/2006 | You et al. | 370/329 |
| 2006/0195899 A1* | 8/2006 | Ben-Shachar et al. | 726/12 |
| 2006/0251055 A1* | 11/2006 | Monette et al. | 370/352 |
| 2007/0016637 A1* | 1/2007 | Brawn et al. | 709/200 |
| 2007/0118842 A1* | 5/2007 | Weida | 719/330 |
| 2007/0162979 A1* | 7/2007 | Kamperman et al. | 726/27 |
| 2007/0250825 A1 | 10/2007 | Hicks et al. | |

OTHER PUBLICATIONS

Hauck et al., "A Flexible and Extensible Object Middleware: CORBA and Beyond", 2005.*
Schlesselman et al., "OMG Data-Distribution Service (DDS): Architectural Update", 2004.*
Mungee et al., "The Design and Performance of a CORBA Audio/Video Streaming Service", 1999.*
Vinoski, "CORBA: Integrating Diverse Applications Within Distributed Heterogeneous Environments", 1997.*
Coyle, "Xml, Web Services, and the Data Revolution", 2002.*
Coen-Porisini et al., "A Formal Approach for Designing CORBA-Based Applications", 2003.*
Zhang et al., "Resolving Feature Convolution in Middleware Systems", 2004.*
Eugster et al., "Abstracting Remote Object Interaction in a Peer-2-Peer Environment", 2002.*
Wang et al., "Toward an adaptive data distribution service for dynamic large-scale network-centric operation and warfare (NCOW) systems", 2008.*
Object Management Group, "The Real-time Publish-Subscribe Wire Protocol DDS Interoperability Wire Protocol Specification version 2.1", copyright 1997-2008.*
Rocha, "SMPPL: A Network Architecture for Collaborative Distributed Services", Sep. 2005, pp. 40-47, 71 and 73.*
Pardo-Castellote, "OMG Data-Distribution Service: Architectural Overview", 2003.*
Hauck et al., "A Flexible and Extensible Object Middleware CORBA and Beyond", 2005.*
Van Halteren et al., "Extending CORBA with Specialised Protocols for QoS Provisioning", 1999.*
Puder et al., "Native ATM support for CORBA Platforms", 1998.*
U.S. Appl. No. 11/379,986, filed Apr. 24, 2006.
U.S. Appl. No. 11/410,563, filed Apr. 24, 2006.
Object Management Group (OMG), "Data Distribution Service for Real-Time Systems Specification," Version 1.1, dated Dec. 2005.
Taylor, Object-Oriented Information Systems Planning and Implementation, pp. 1-172, 215-282, Apr. 10, 1992.
Rational Rose, Using Rational Rose 4.0, Rational Software Corporation, pp. 1-219, Nov. 1996.
Quatrani, Terry,Visual Modeling with Rational Rose and UML, pp. 1-6, Third Printing Apr. 1998.
Case et al., A Simple Network Management Protocol (SNMP), May 1990, IETF, RFC 1157, pp. 2, 6-8, 10, 12, 16, 19-20, 25, 27.
McCloghrie et al., Management Information Base for Network Management of TCP/IP-based internets, Aug. 1988, IETF, RFC 1066, pp. 10-11.
Rose et al., Structure and Identification of Management Information for TCP/IP-based internets, Aug. 1988, IETF, RFC 1065, pp. 7-8, 10.
Information Sciences Institute, USC, Internet Protocol, Sep. 1981, IETF, RFC 791, pp. 11.
Postel, J., User Datagram Protocol, Aug. 28, 1980, IETF, RFC 768, pp. 1.
UML Booch & Omt, Quick Reference for Rational Rose 4.0, 1996, Rational Software Corporation, pp. 10.
Burnett et al., "Concepts and Environments—Visual Object-Oriented Programming", 1995, Manning Publications Co., pp. 276.
Firesmith et al., "Dictionary of Object Technology", Sigs Books, 1995, pp. 5.
Castellote et al., "NDDS: The Real-Time Publish-Subscribe Middleware," Proceedings of the IEEE Real-Time Systems Symposium, 1997, 11 pages.
Castellote et al., "The Network Data Delivery Service: Real-Time Data Connectivity for Distributed Control Applications," Proceedings of the International Conference on Robotics and Automation, IEEE, May 1994, 7 pages.
Office Action dated May 20, 2005 from U.S. Appl. No. 10/118,470.
Final Office Action dated Nov. 15, 2005 from U.S. Appl. No. 10/118,470.
Office Action dated Sep. 15, 2006 from U.S. Appl. No. 10/118,470.
Final Office Action dated Apr. 4, 2007 from U.S. Appl. No. 10/118,470.
Office Action dated Jul. 21, 2008 from U.S. Appl. No. 10/118,470.
Final Office Action dated Aug. 20, 2009 from U.S. Appl. No. 10/118,470.
Office Action dated May 26, 2010 from U.S. Appl. No. 10/118,470.
Notice of Allowance dated May 26, 2010 from U.S. Appl. No. 11/410,563.
Notice of Allowance dated Mar. 30, 2010 from U.S. Appl. No. 11/379,986.
Notice of Allowance dated Sep. 10, 2010 from U.S. Appl. No. 10/118,470.
Office Action dated Jul. 14, 2011 from U.S. Appl. No. 12/965,589.
Office Action dated Mar. 15, 2012 from U.S. Appl. No. 12/868,641.
Notice of Allowance dated Nov. 23, 2011 from U.S. Appl. No. 12/965,589.
Notice of Allowance dated Sep. 10, 2012 from U.S. Appl. No. 12/868,641.

* cited by examiner

FLEXIBLE MECHANISM FOR IMPLEMENTING THE MIDDLEWARE OF A DATA DISTRIBUTION SYSTEM OVER MULTIPLE TRANSPORT NETWORKS

CROSS-REFERENCE TO RELATED APPLICATIONS

This application is related to co-pending and concurrently filed application Ser. No. 11/379,986, filed Apr. 24, 2006, entitled "MEMORY USAGE TECHNIQUES IN MIDDLEWARE OF A REAL-TIME DATA DISTRIBUTION SYSTEM", by Stephen Jisoo Rhee, Yi Dai, Gerardo Pardo-Castellote, and Rajive Joshi, which is incorporated by reference herein for all purposes.

This application is related to co-pending and concurrently filed application Ser. No. 11/410,563, filed Apr. 24, 2006, entitled "A FRAMEWORK FOR EXECUTING MULTIPLE THREADS AND SHARING RESOURCES IN A MULTITHREADED COMPUTER PROGRAMMING ENVIRONMENT", by Stephen Jisoo Rhee, Elaine Yee Ting Sin, Gerardo Pardo-Castellote, Stefaan Sonck Thiebaut, and Rajive Joshi, which is incorporated by reference herein for all purposes.

BACKGROUND OF THE INVENTION

The present invention relates to the interface between middleware and the underlying transport services (e.g. network stack) that allow separate processes and computers to communicate with each other.

In the context of this invention, middleware is a layer of software that lies between a lower layer or software (typically the operating system) and higher layers of software which include the end-user application. Middleware can implement one or more communication models and offer those as a service to the higher layers. For instance middleware can implement a real-time publish-subscribe communications model to allow distributed processes to share data without concern for the actual physical location or architecture of their peers. The middleware may include support for best-effort and reliable communications. For example, the Object Management Group's (OMG) Data Distribution Service for Real-Time Systems (DDS) is a standard specification for middleware that implements and offers a publish-subscribe data-distribution system model to the software layers above. The purpose of the specification is to provide a common application-level interface that clearly defines the capabilities and behavior of the data-distribution service.

DDS uses a publish-subscribe (P-S) communication model. The P-S communication model employs asynchronous message passing between concurrently operating sub-systems. The publish-subscribe model connects anonymous information producers with information consumers. The overall distributed system is composed of processes, each running in a separate address space possibly on different computers. In this patent application, each of these processes of the distributed system is referred to as a "participant application". A participant application may be a producer or consumer of data, or both.

Using the middleware, data producers declare the topics on which they intend to publish data; data consumers subscribe to the topics of interest. When a data producer publishes some data on a topic, the middleware operates such that all the consumers subscribing to that topic receive it. The data producers and consumers remain anonymous, resulting in a loose coupling of sub-systems, which is well suited for data-centric distributed applications. This is referred to as a DCPS (data-centric publish subscribe) architecture.

The DCPS model employs the concept of a "global data space" of data-objects that any entity can access. Applications that need data from this space declare that they want to subscribe to the data, and applications that want to modify data in the space declare that they want to publish the data. A data-object in the space is uniquely identified by its keys and topic, and each topic has a specific type. There may be several topics of a given type. A multiplicity of independent Global Data Spaces may be created. Each global data space is identified by its domain id. Each subscription/publication must belong to the same domain in order to communicate.

For example, the reader is referred to the Object Management Group's Specification entitled "Data Distribution Service for Real-Time Systems Specification," Version 1.1, dated December 2005. See http://www.omg.org/docs/formal/05-12-04.pdf (referred to herein as "DDS Specification"). In the DDS Specification, a DCPS architecture is specified that includes the following entities: DomainParticipant, DataWriter, DataReader, Publisher, Subscriber, and Topic. All these classes extend Entity, which is an abstract base class for all the DCPS objects that support QoS policies, a listener, and a status condition. The particular extension of Entity represents the ability to be configured through QoS policies, be enabled, be notified of events via listener objects, and support conditions that can be waited upon by the application. Each specialization of the Entity base class has a corresponding specialized listener and a set of QoSPolicy values that are suitable to it.

A Publisher represents the object responsible for data issuance. A Publisher may publish data of different data types. A DataWriter is a typed facade to a publisher; participants use DataWriter(s) to communicate the value of and changes to data of a given type. Once new data values have been communicated to the publisher, it is the Publisher's responsibility to determine when it is appropriate to issue the corresponding message and to actually perform the issuance (the Publisher will do this according to its QoS, or the QoS attached to the corresponding DataWriter, and/or its internal state).

A Subscriber receives published data and makes it available to the participant. A Subscriber may receive and dispatch data of different specified types. To access the received data, the participant must use a typed DataReader attached to the subscriber.

The association of a DataWriter object (representing a publication) with DataReader objects (representing the subscriptions) is done by means of the Topic. A Topic associates a name (unique in the system), a data type, and QoS related to the data itself. The type definition provides enough information for the service to manipulate the data (for example serialize it into a network-format for transmission).

The DDS middleware handles the actual distribution of data on behalf of a user application. The distribution of the data is controlled by user settable Quality of Service (QoS).

Data distribution middleware is characterized by delivery of data over a variety of physical and logical communication media such as Ethernet-based networks, other LAN, Wireless, or WAN technologies, shared-memory, local busses (PCI, VME), high-speed serial interconnects, etc. A flexible approach is needed to enable the specification, configuration, and seamless usage of multiple transport networks in a data distribution system.

SUMMARY OF THE INVENTION

To achieve the foregoing and in accordance with the purpose of the present invention a method of implementing data distribution middleware over a plurality of transport networks is provided. A domain participant is created. A transport plugin for the domain participant is created. The transport plugin is registered with the domain participant.

In another manifestation of the invention a method of providing transports for a data distribution middleware over a plurality of transport networks is provided. A data distribution middleware with a pluggable transport layer is provided. A plurality of transport plugins in the transport layer are provided. Aliases are assigned to each of the transport plugins of the plurality of transport plugins, wherein at least one of the transport plugins of the plurality of transport plugins has a plurality of aliases.

In another manifestation of the invention a method of providing transports for a data distribution middleware over a plurality of transport networks is provided. A data distribution middleware with a pluggable transport layer is provided. A plurality of transport plugins are provided. A plurality of domain participants are provided. A plurality of transport plugins are associated with the plurality of domain participants.

In another manifestation of the invention a method for creating transport plugins is provided. Commands from the Data distribution middleware are sent to a plurality of transport plugins to create send resources and receive resources. Send resources and receive resources are created before the resources are needed. The send resources and receive resources are kept and managed in the data distribution middleware core. Requests from the data distribution middleware are sent to the plurality of transport plugins to share send resources and receive resources.

In another manifestation of the invention, computer readable media for providing transports for a data distribution middleware implementation over a plurality of transport networks is provided. Computer readable code for creating a domain participant is provided. Computer readable code for creating a transport plugin for the domain participant is provided. Computer readable code for registering the transport plugin with the domain participant is provided.

In another manifestation of the invention computer readable code for providing transports for a data distribution middleware over a plurality of transport networks is provided. Computer readable code for providing a data distribution middleware with a pluggable transport layer is provided. Computer readable code for providing a plurality of transport plugins in the transport layer is provided. Computer readable code for assigning aliases to each of the transport plugins of the plurality of transport plugins is provided, wherein at least one of the transport plugins of the plurality of transport plugins has a plurality of aliases.

In another manifestation of the invention, computer readable media for providing transports for a data distribution middleware over a plurality of transport networks is provided. Computer readable code for providing a data distribution middleware with a pluggable transport layer is provided. Computer readable code for providing a plurality of transport plugins is provided. Computer readable code for providing a plurality of domain participants is provided. Computer readable code for associating the plurality of transport plugins with the plurality of domain participants is provided.

In another manifestation of the invention for creating transport plugins is provided. Computer readable code for sending commands from the Data distribution middleware to a plurality of transport plugins to create send resources and receive resources is provided. Computer readable code for creating send resources and receive resources before the resources are needed is provided. Computer readable code for keeping and managing the send resources and receive resources in the data distribution middleware core is provided. Computer readable code for sending requests from the data distribution middleware to the plurality of transport plugins to share send resources and receive resources is provided.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Within the context of this invention, middleware is the software that resides between an application and the operating system. Data distribution middleware moves data around among the nodes of a data distribution system. The OMG Data Distribution Service (DDS) is an API specification for accessing a data distribution middleware from a higher layer of code such as the application code (sometimes referred to as user application code).

Figure 1:
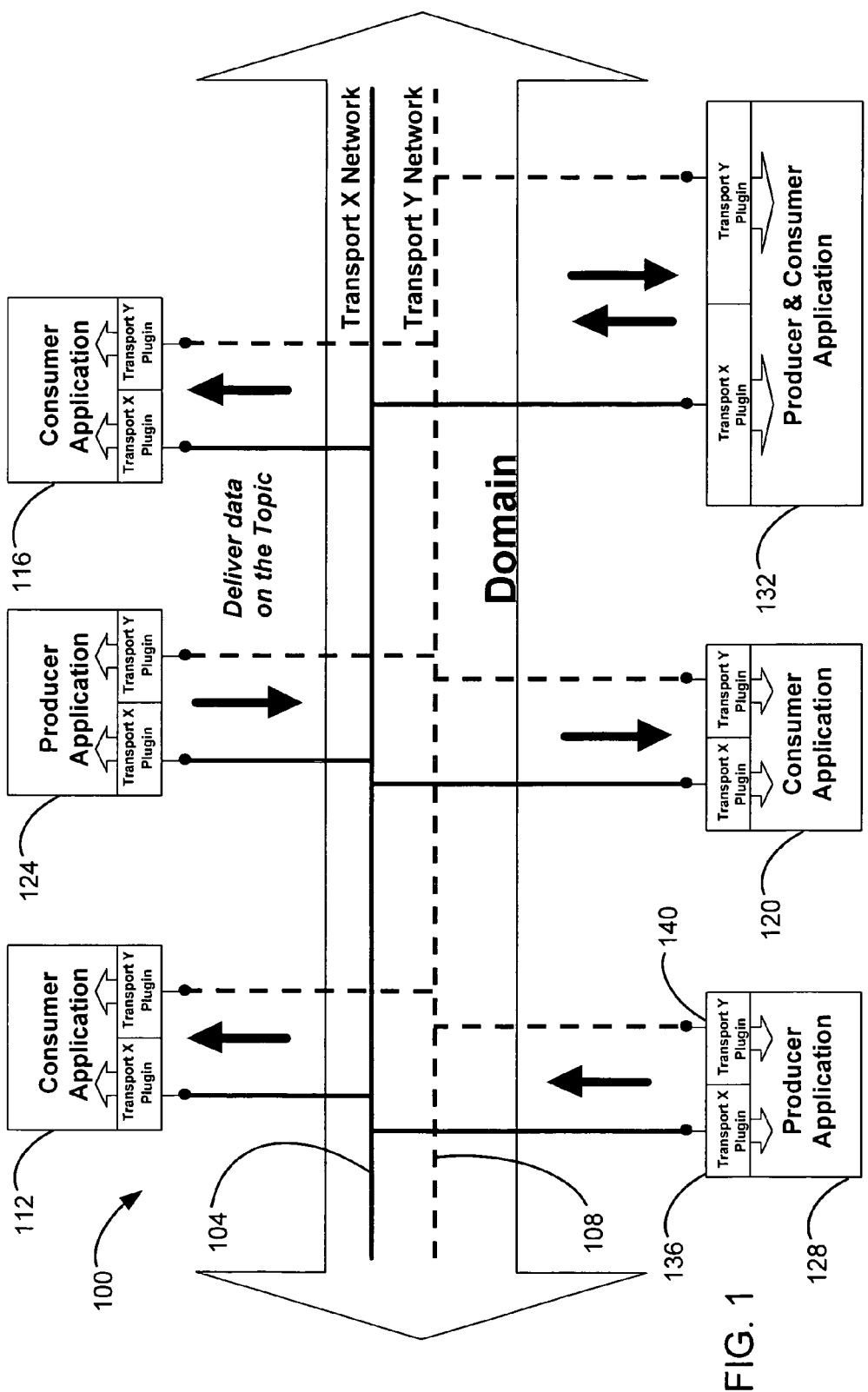
FIG. 1 is a schematic view of a data distribution system.

DDS does not specify a transport model. Instead, it focuses on the logical model of data distribution. A DDS middleware implementation must run over some physical or logical transports to distribute data. This invention describes a flexible and general purpose mechanism for implementing the middleware of a data distribution system over multiple transport networks, and in particular a mechanism to implement DDS middleware that can deliver data using multiple transports in a DDS domain A data distribution system can implement this logical data distribution model to run over multiple transports. A data distribution domain may include producers or consumers that can send and receive messages over multiple transports. To facilitate understanding, FIG. 1 is a schematic view of a data distribution system 100 with a first transport network 104 (Transport X Network) and a second transport network 108 (Transport Y Network). In this data distribution system a first consumer application 112, a second consumer application 116, and a third consumer application 120 are shown. The consumer applications 112, 116, 120 subscribe to various topics of interest. A first producer application 124 and a second producer application 128 are also shown. The producer applications 124, 128 declare topics on which they intend to publish data, and then publish data on those declared topics. The consumer applications then receive published data on topics to which they subscribe. A producer and consumer application 132 is also shown, which both produces data on a topic and subscribes to data on a topic. In this example each application 112, 116, 120, 124, 128, 132, has a Transport X plugin 136, for communication over Transport X Network, and a Transport Y plugin 140, for communication over Transport Y Network. In general, an application may have one or more transport plugins for communication over one or more transport networks. Some of the transport types that may be used for Transport X Network or Transport Y Network are IPv6, IPv4, shared memory, serial links, or serial interconnect networks including StarFabric, Infiniband, Rapic Fabric, RapidIO, Advanced Switching, or bus-based networks including VME, PCI, PCI-X, or other physical media used to move bits around. New transport networks may be developed in the future. It would be desirable to be able to easily configure an existing data distribution system to use new transport networks as they are developed. In an embodiment of the invention, each Transport X plugin is an instance of a Transport X plugin class and each Transport Y plugin is an instance of a Transport Y plugin class. A transport plugin class implements a way to communicate on a specific transport network. Different transport networks may have different internal addressing schemes. A transport plugin maps the transport specific addressing scheme to a transport independent addressing scheme. A transport independent addressing scheme is used by the data distribution system to uniformly address different nodes connected over one or more transport networks. One or more applications 112, 116, 120, 124, 128, 132 may be run on the same node.

Figure 2:
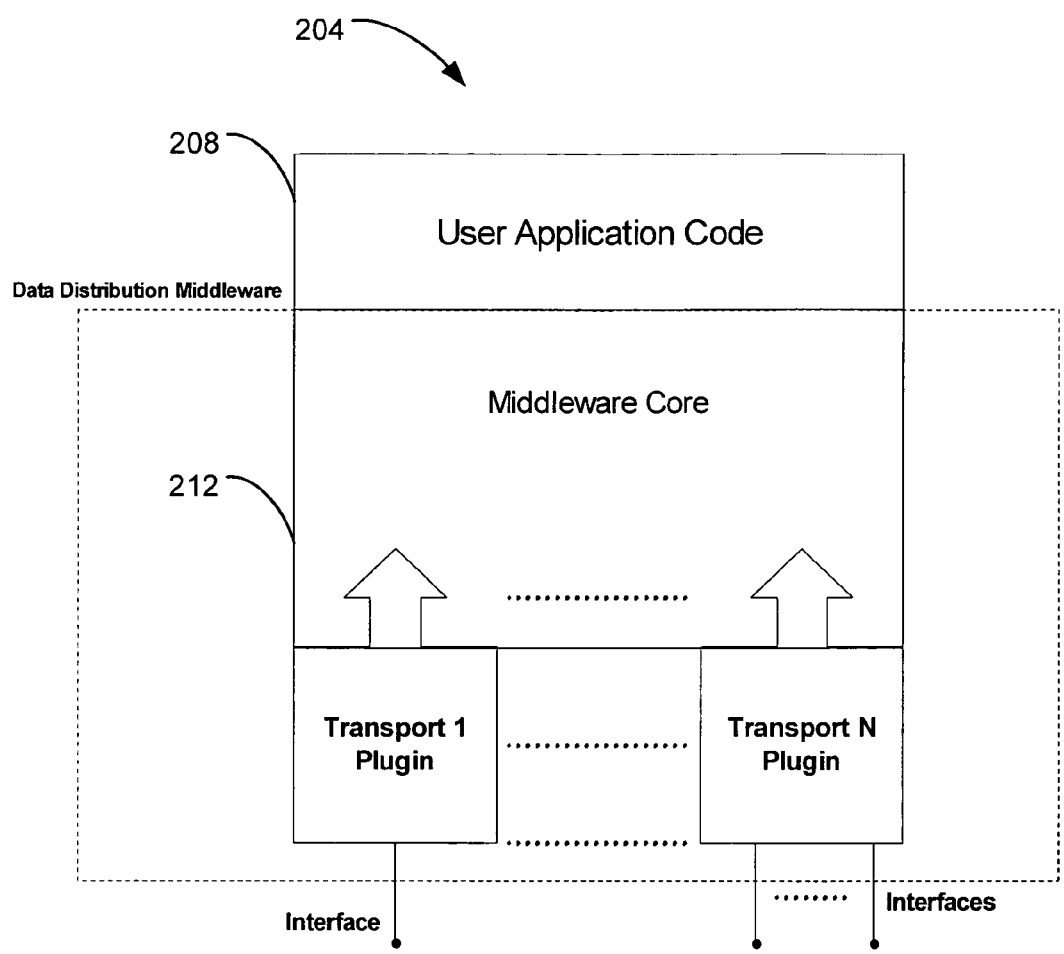
FIG. 2 is more detailed schematic illustration of an application on a node in the data distribution system.

FIG. 2 is more detailed schematic illustrations of any one of the applications 112, 116, 120, 124, 128, 132 used in the embodiment of the invention. Each of the applications 204 comprises a user application code 208 is supported by a data distribution system which includes the Middleware core 212, and transport plugins registered for uses with the Middleware core. The Middleware core 212 and the transport plugins are supported by an operating system or environment.

Figure 3:
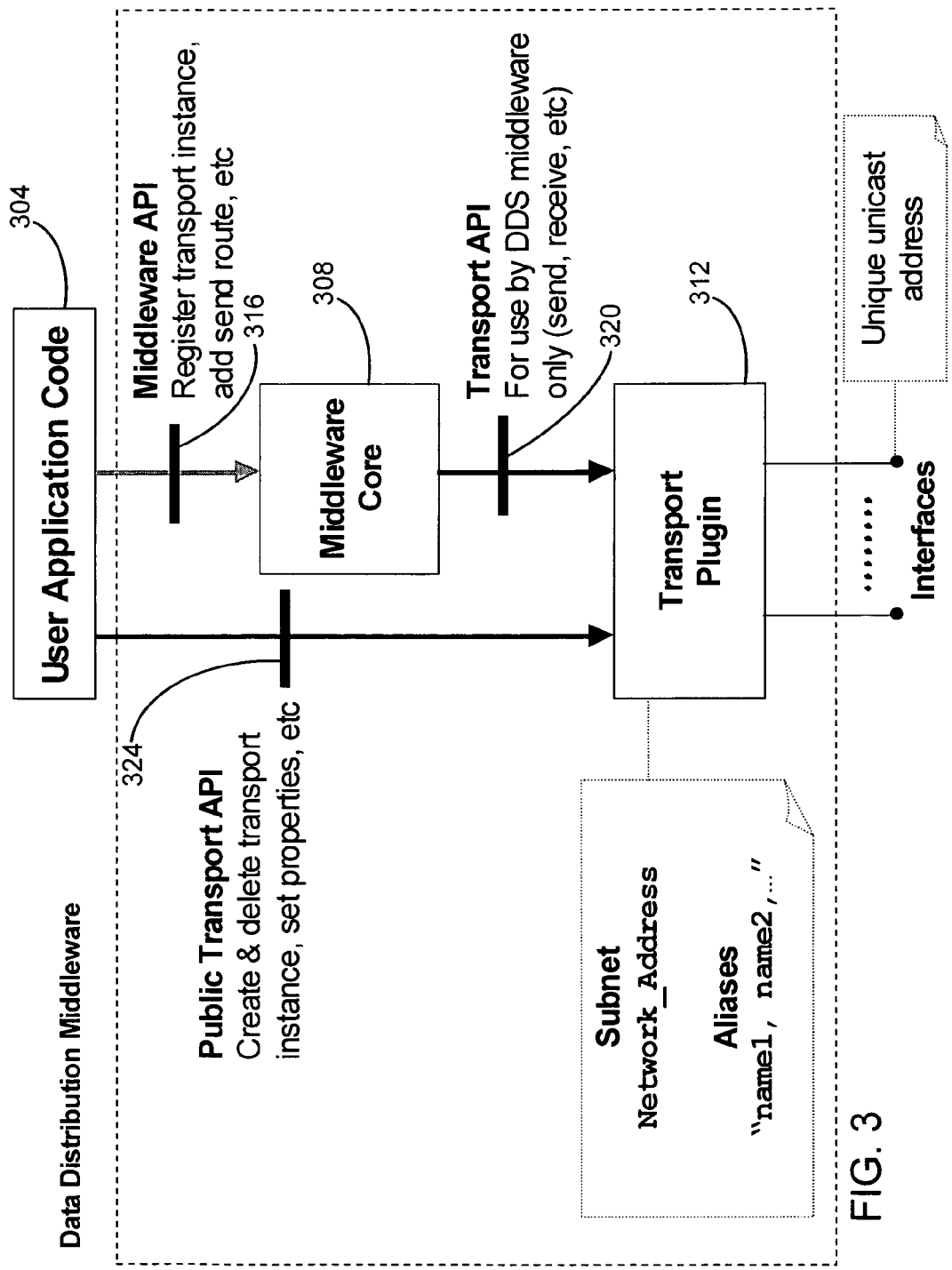
FIG. 3 is a schematic view of transport API's that may be used in a preferred embodiment of the invention.

FIG. 3 is a schematic view of transport API's that may be used in a preferred embodiment of the invention. A user application code 304, DDS middleware core 308, and transport plugin 312 are shown. The data distribution system includes the Middleware core and the transport plugins used to communicate with other nodes. The DDS middleware core 308 uses different transport plugins 312, and enables the user application code 304 to distribute data over different communication media using via the transport plugins. A Middleware API 316 comprises the DDS API standard defined by the Object Management Group (OMG) of Needham, Mass., and additional extensions to support transport plugins. This architecture allows user application code 304 to run over new transport networks (that may not have been yet conceived), simply by registering a new transport plugin with the Middleware core 308. Transport plugins 312 for different kinds of transport networks can be developed independently of the user application code 304 or the Middleware core 308.

A well defined transport API 320 specifies the interface that must be implemented by all transport plugin implementations. A new transport plugin class can be developed for a new transport network by implementing the transport API 320. The transport API 320 is used by the Middleware core implementation, and includes methods to map a transport independent address representation to a transport network specific address representation, and methods to send and receive messages over the transport network.

A transport plugin provides transport plugin implementation specific public transport API 324 to create and delete transport plugin instances, and possibly to change their properties. This public transport API 324 is used by the user application code to create new instances of a transport plugin class that can then be registered with the Middleware core using the registration methods defined in the Middleware API 316.

When a transport plugin 312 is registered with the Middleware core 308, the transport plugin is associated with at least one alias. An alias is a way of symbolically referring to the transport plugin registered with the Middleware core from other entities, for example Data Readers and Data Writers defined in the Middleware API 316. Multiple transport plugins can be registered with the same alias; and a transport plugin can be registered under multiple aliases. Thus, aliases provide a very powerful and flexible mechanism for organizing and referring to a collection of transport plugins from various data distribution system API entities. For example, a StarFabric transport plugin may be registered under the aliases "fast" and "large" since StarFabric is a very fast transport capable of transferring large messages in a single operation. Either alias may be used to refer to this transport plugin. In addition, the "fast" alias may also be used to refer to a transport plugin for Gigabit Ethernet, since it can also transfer messages very fast. In this example scenario, when a data distribution middleware entity refers to transport plugins using the alias "fast", both the StarFabric and the Gigabit Ethernet transport would be used; however when a data distribution middleware entity refers to transport plugins using the alias "large", only the StarFabric transport would be used.

A transport plugin implementation provides the notion of "Interfaces" via which it accesses the physical transport network. An Interface can be thought of as a logical "access point" associated with a unique unicast address, and gives access to a subnet specific to the transport network. A transport plugin provides at least one Interface to the transport network. To illustrate the concept of an Interface, consider for example an IP network, when an Interface may represent the physical network interface cards (NICs) that can be used by an IP transport plugin. Or for example, in a shared memory transport network, an Interface may represent a "software" access point with a unicast address that can be used to send and receive messages via shared memory. In general, a transport plugin provides access to one or more transport networks for a given transport class, via one or more interfaces. The Middleware core can access multiple classes of transport networks via different types of transport plugins.

The data distribution system uses N bits of transport-independent addressing. For example, in the preferred embodiment of the invention modeled after IPv6 addressing scheme, N=128 bits. The transport API 320 requires a transport plugin implementation to declare how many bits it needs for addressing within a transport network of that class. This property is known as the address_bit_count and is fixed for all transport plugins of a given class. For example, in the case of an IPv4 network, N=32 bits; in the case of a single point-to-point serial link N=1 bit, since there are only two possible interfaces in the entire point-to-point serial link network.

A transport plugin is expected to use only those bits; the remaining (N-address_bit_count) bits are referred to as the network_address and can be freely assigned when registering a transport plugin with the Middleware core 308.

Figure 4:
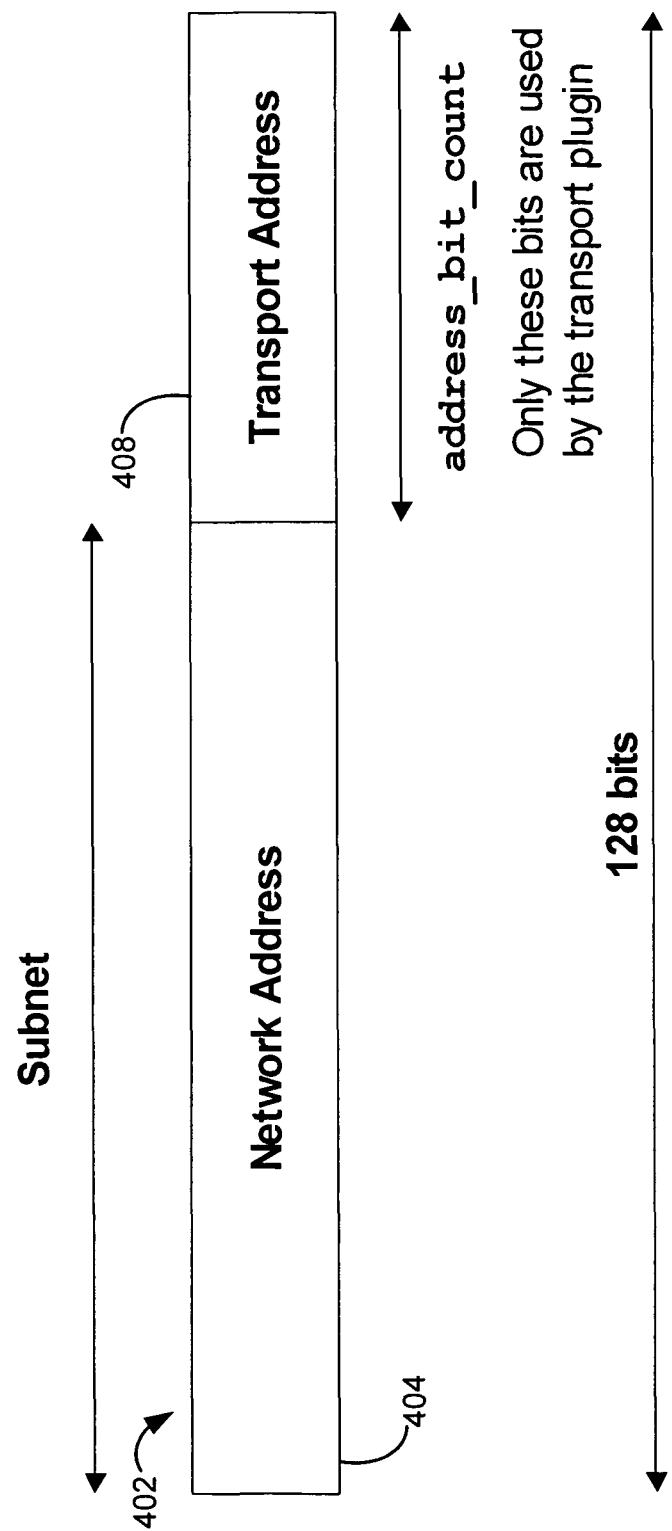
FIG. 4 is a schematic view of a transport independent fully qualified unicast address used in the preferred embodiment of the invention.

FIG. 4 is a schematic view of a transport independent fully qualified unicast address used in the preferred embodiment of the invention. The unicast address 402 of N bits comprises a network address 404, which specifies a subnet, and a transport specific address 408. The transport plugin only understands and uses the transport specific address of address_bit_count bits, and transport plugin ignores the network address portion. Thus, the transport address is meaningful only with in the transport network.

The network_address is used by the Middleware core, and is chosen to ensure that the unicast address of each transport plugin interface (across multiple transport plugins) is unique. This ensures that each Interface in the domain (across multiple classes of transport networks) has a unique identifying unicast address; thus, a message can be un-ambiguously routed to a specific Interface (and therefore the appropriate transport plugin). Thus, if a domain includes multiple identical transport networks, a judicious choice of network address can ensure that identical interfaces in the two networks have unique unicast addresses in the domain, and that there is no address collision.

The network_address is chosen when a transport plugin 312 is registered with the Middleware core 308. The network address must be chosen to ensure that the unicast address of each interface used by the transport plugin is unique in the domain. For built-in transport plugins that are registered automatically, the network address can be automatically generated. For example, in a preferred embodiment of the invention, the network addresses for shared memory and built-in UDP transport plugins are automatically generated so they can co-exist without address collision.

For transport plugins explicitly registered by the application code, the network address must be chosen judiciously to ensure that each interface in the data distribution system domain has a unique unicast address. Since the full N-bit unicast address 402 is a combination of a transport independent network address 404 and a transport specific address 408, the network address 404 does not need to be unique and the transport address 408 does not need to be unique to provide the required unique unicast address. However, the combination, shown in FIG. 4, however must result in a unique unicast address of N bits used to identify an interface in the data distribution system domain, across multiple transport types and networks.

A transport plugin Interface may join one or more multicast groups. In a preferred embodiment of the invention, the multicast addressing scheme is modeled after the IP addressing scheme. All transport plugin interfaces that have subscribed to a multicast group address, receive all the messages sent to that multicast group address. A transport plugin is responsible for mapping the notion of a transport independent multicast group into a transport specific notion of multicast and joining/leaving transport specific multicast groups.

Figure 12:
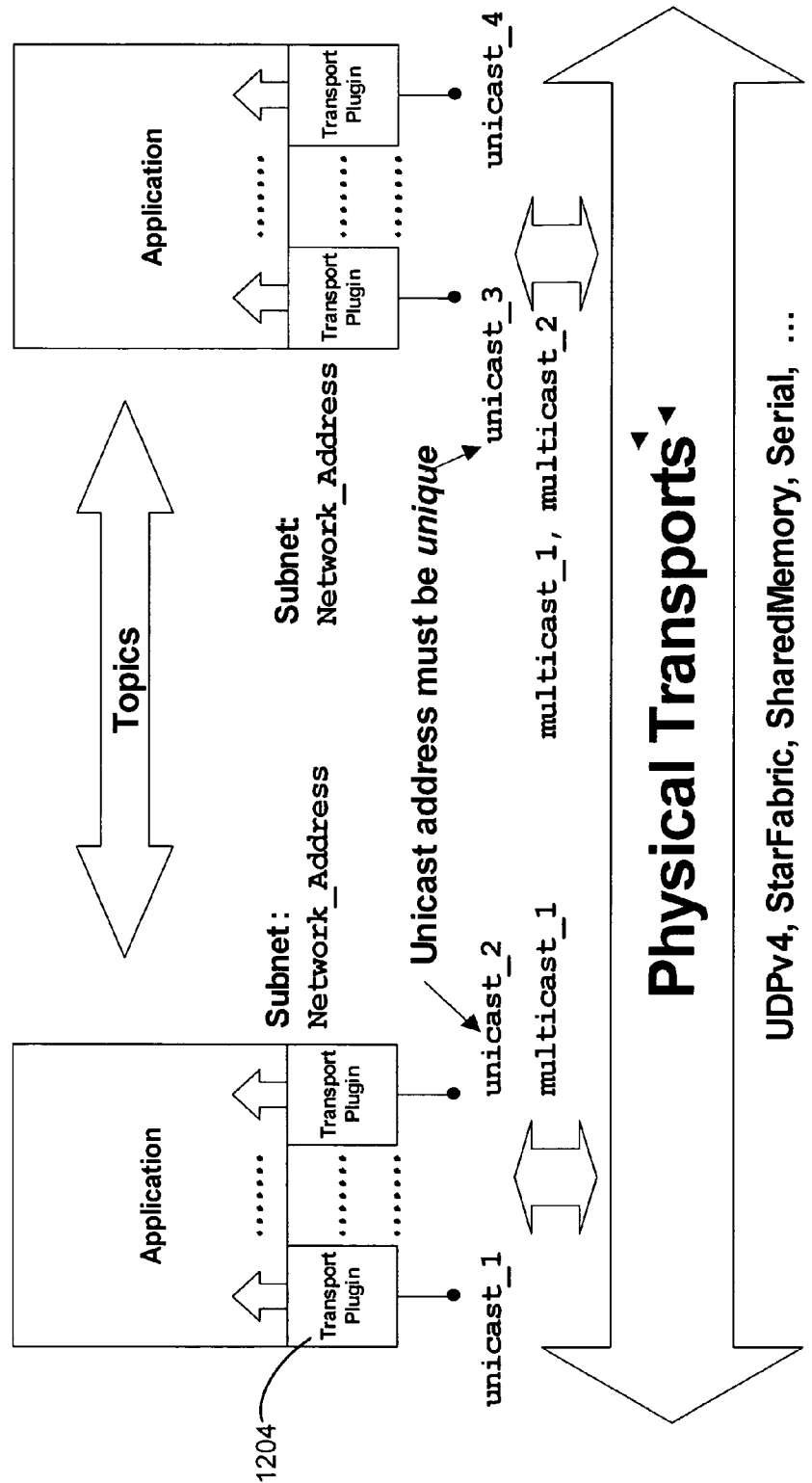
FIG. 12 illustrates a system for choosing a network address.

FIG. 12 illustrates the above concepts schematically. The network address for each transport plugin 1204 is chosen so that the resulting address obtained by combing the network address with the transport specific address of the interface results in a unique address in the domain. An interface can join multiple multicast group addresses. A transport independent multicast group address can include multiple transport interfaces across different classes of transport networks.

Figure 14:
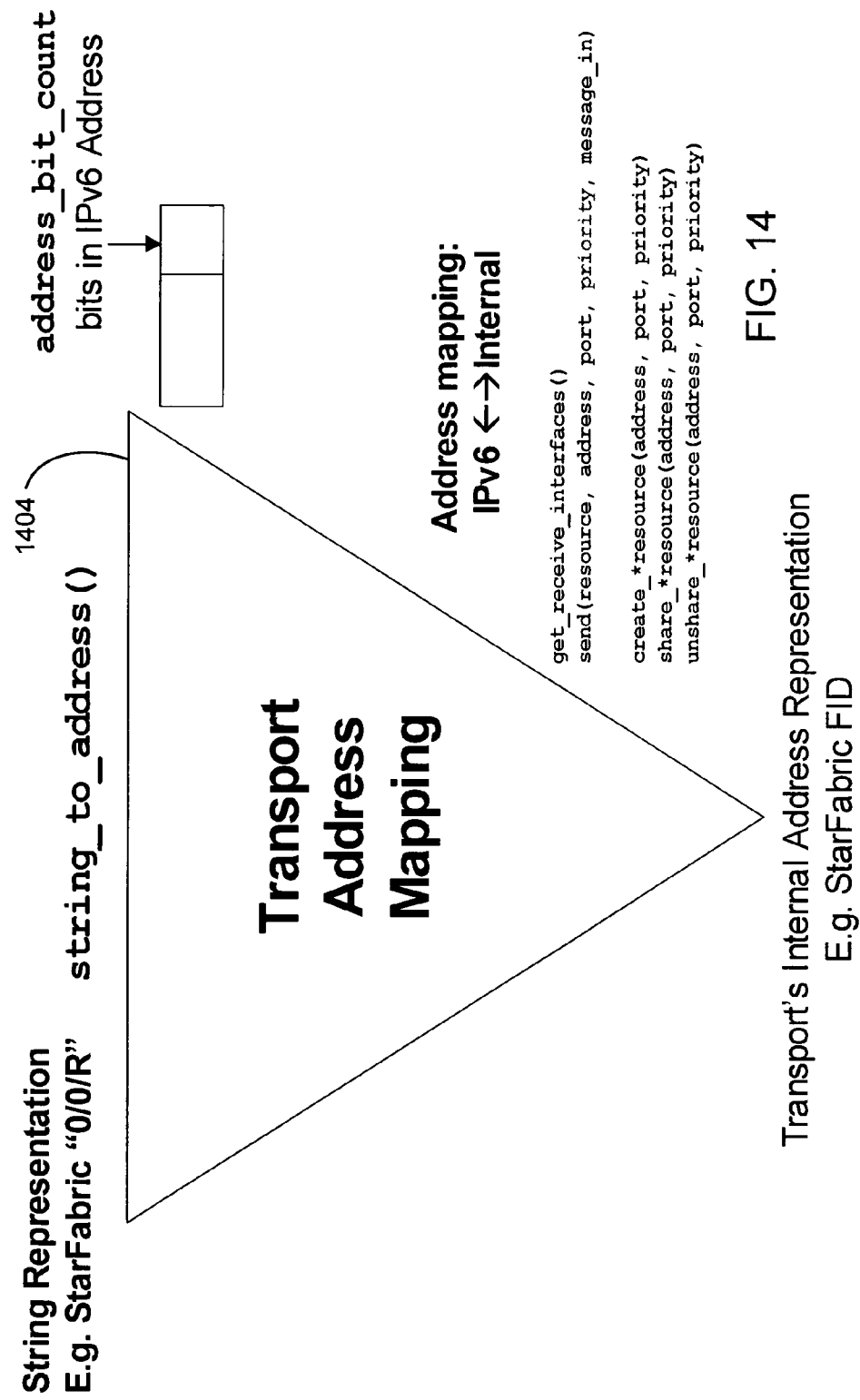
FIG. 14 is a schematic view of a the address mapping performed by a transport plugin, between a transport independent numeric sub-address, a transport specific internal representation, and a transport specific external string representation used in the preferred embodiment of the invention.

FIG. 14 illustrates the mapping between a transport independent address representation (as address_count_bits) and an internal transport network specific address representation that must be performed by a transport plugin. The Middleware core 308 API to a transport plugin uses the transport independent address_bit_count bits. However, internal to the transport network, this address representation may get mapped to another representation. FIG. 14 illustrates this with an example from a StarFabric transport plugin, where internally to the StarFabric transport network a "Fabric Identifier or FID" is used to address and route messages within the StarFabric network. The FID is converted to an N=32 bit representation, which is stored and shared by the data distribution system on behalf of the transport plugin.

The numeric representation of an address (of N bits) can be un-wieldy and awkward for the user application code or the user. Therefore, a string representation can be used for the network address and for the transport specific address portions of an address. A transport plugin provides a string_to_address( ) method for converting between the transport specific string representation and the transport independent numeric representation using address_bit_count bits. This is illustrated in FIG. 14 for a StarFabric transport plugin, where a StarFabric node may be naturally identified by the string "0/0/R", and gets mapped 1404 by the StarFabric transport plugin into the transport independent numeric representation expressed in address_bit_count bits. As discussed previously, the transport plugin would internally map this transport independent representation into a transport network specific representation (for example the StarFabric FID in the example above).

Figure 5:
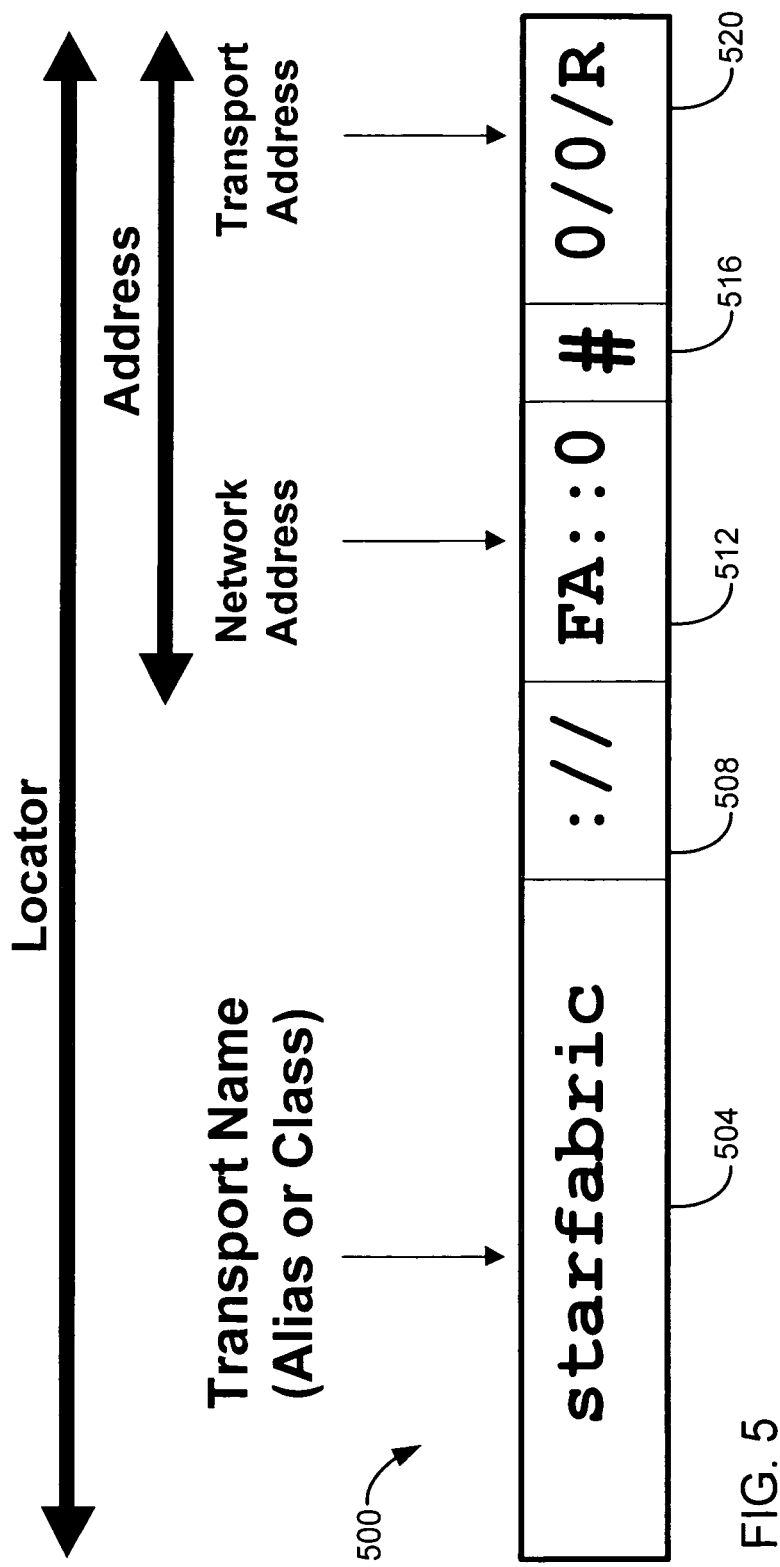
FIG. 5 is a schematic view of a locator string.

The network_address portion of an address can be represented using any conventional string representation for binary addresses. For example, in a preferred embodiment modeled after IP addressing, the network address would be represented in a string form using IP notation. The network address in string representation can be concatenated (using a separator) with the transport address string representation, to yield an address string that can be naturally manipulated by a user or user application code. Furthermore, a transport alias or class name can be concatenated (using a separator) with the address string to yield a locator string. FIG. 5 is a schematic view of a locator string 500, illustrated for a StarFabric transport example, where the locator string 500 representation comprises a transport name 504, which may designate either an alias or class, a first separator 508, a network address 512 represented as a string, a second separator 516, and a transport address 520 represented as a string.

The Middleware core uses the transport independent addressing scheme to specify a destination for sending messages. A destination is specified by a locator, which includes a class id, a transport independent address (N bits), and a port number. The address identifies one or more transport interfaces (exactly one interface in the case of a unicast address, and zero or more interfaces in the case of multicast group address). A port number identifies a resource for receiving messages at a given transport interface. A locator can be represented in user-friendly string format by expressing it as a locator string 500 and port number string pair. Note that a locator string 500 and a port number pair can represent multiple locators, since a transport name 504 can refer to multiple transport plugin for different transport classes. A user or user application code can specify the information about the location of initial peer participants using string based addressing.

Figure 6:
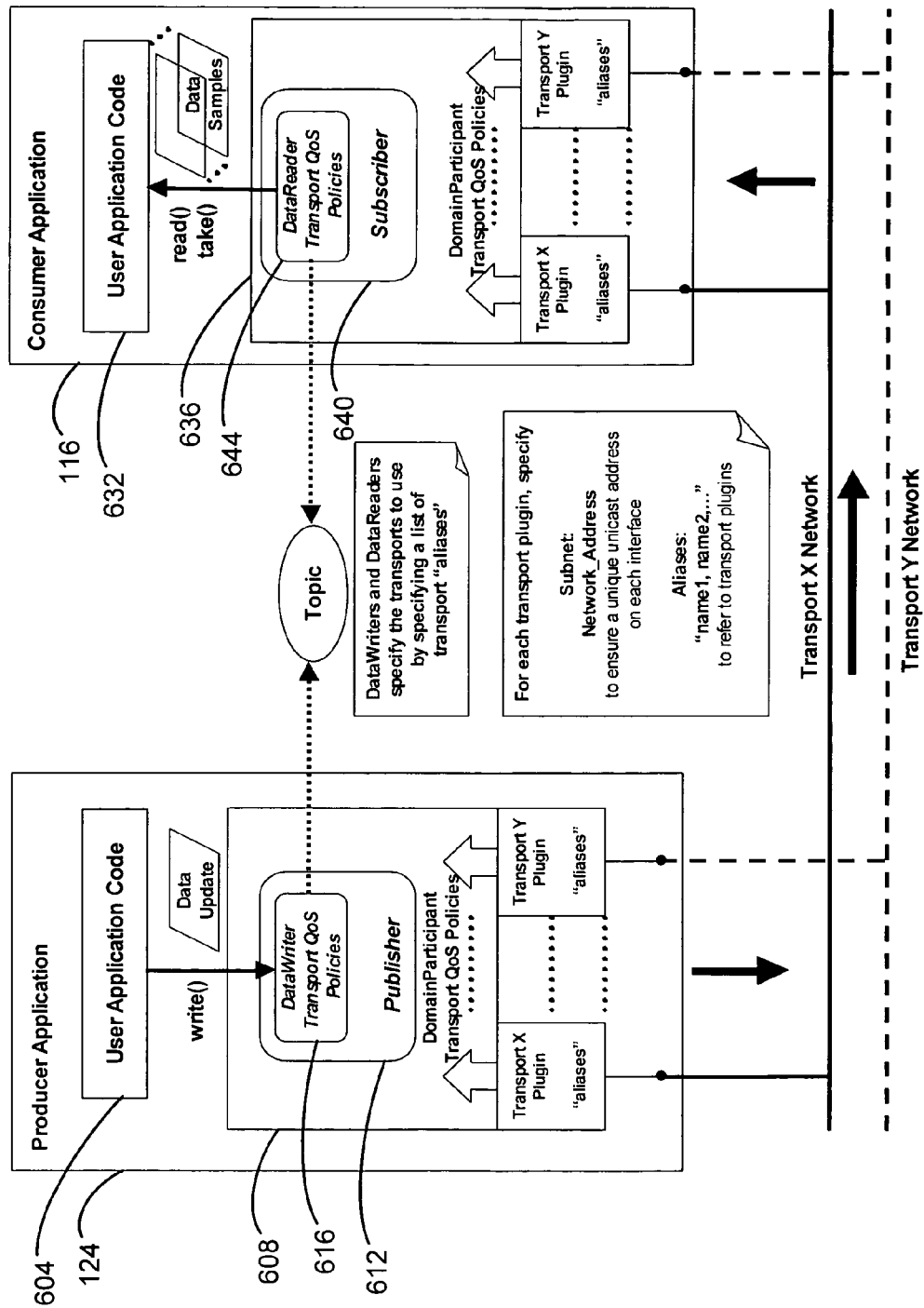
FIG. 6 is a more detailed schematic view of a first producer application and a second consumer application communicating over multiple transport networks.

FIG. 6 is a more detailed schematic view of the first producer application 124 and the second consumer application 116 communicating over multiple transport networks. As schematically illustrated in FIG. 6, the Producer Application 124 comprises of user application code 604, which uses the write( ) operation on a Data Writer 616 to distribute updates to data-objects. The producer user application code 604 creates a Domain Participant 608, and from it is created a Publisher 612, and from it is created a Data Writer 616.

The consumer Application 116 comprises a user application code 632, which upon determining that data samples are available, uses the read( ) or take( ) operation on a Data Reader to access data samples delivered to the Data Reader. The consumer user application code 116 creates a Domain Participant 636 and from it is created a Subscriber 640, and from it is created a Data Reader 644.

Transport plugins are registered with a Domain Participant; however the user application code may want to specify the transport plugins that a Data Writer should use to send messages, or the transport plugins from which that a Data Reader ought to receive messages. This is achieved by specifying Transport QoS policies (FIG. 6) with the Data Writer, Data Reader, and the Domain Participant entities. The transport QoS policies use aliases to refer to one or transport plugins.

Figure 7:
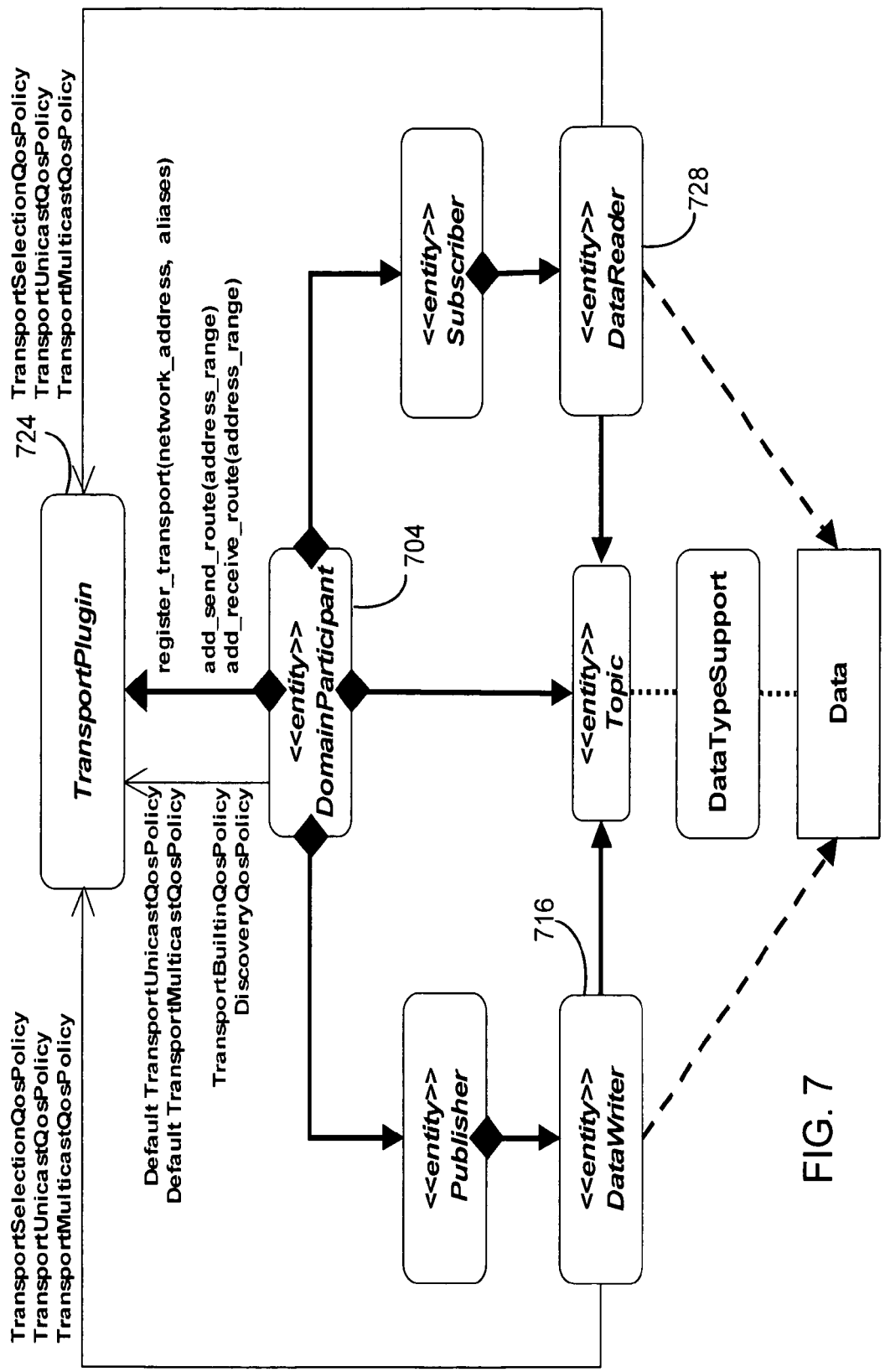
FIG. 7 is a schematic illustration of the relationships between transport plugins and DDS entities.

FIG. 7 is a schematic illustration of the relationships between transport plugins and DDS entities in the preferred embodiment of the invention, using Unified Modeling Language (UML) notation. A Data Writer 716 and the Data Reader 728 endpoints are associated with one or more transport plugins 724 Transport QoS Policies. The Transport Selection QoS Policy is used to specify which Transport Plugins 724 (out of the set of transport plugins registered with the Domain Participant) are available for use by the end point (Data Writer 716 or Data Reader 728). The Transport Unicast QoS Policy is used to specify which Transport Plugin 724 of the Transport Plugins available for use by the endpoint (Data Writer 716 or Data Reader 728) are to be used for unicast messaging; the Transport Unicast QoS Policy also specifies the port number at which incoming unicast messages should be received. The Transport Multicast QoS Policy is used to specify which Transport Plugins 724 of the Transport Plugins available for use by the endpoint (Data Writer 716 or Data Reader 728) are to be used for multicast messaging; the Transport Multicast QoS Policy also specifies the multicast group address and port number at which incoming multicast messages should be received. In each of these Transport QosPolicies, the transport plugins are referred to by their aliases; each policy allows the user application to specify a sequence of aliases.

A default Transport Unicast QosPolicy and a default Transport Multicast QosPolicy is associated with a Domain Participant 704. If a Transport Unicast QosPolicy is not explicitly specified on an endpoint (Data Writer 716 or Data Reader 728), the default Transport Unicast QosPolicy of the Domain Participant 704 is used. If a Transport Multicast QosPolicy is not explicitly specified on an endpoint (Data Writer 716 or Data Reader 728), the default Transport Multicast QosPolicy of the Domain Participant is used. If the default Transport Unicast QosPolicy and a default Transport Multicast QosPolicy are not explicitly specified on a Domain Participant, then the default value of these QoS Policies is to use all the transport plugins registered with the Domain Participant with default values for port number and multicast address.

Figure 11:
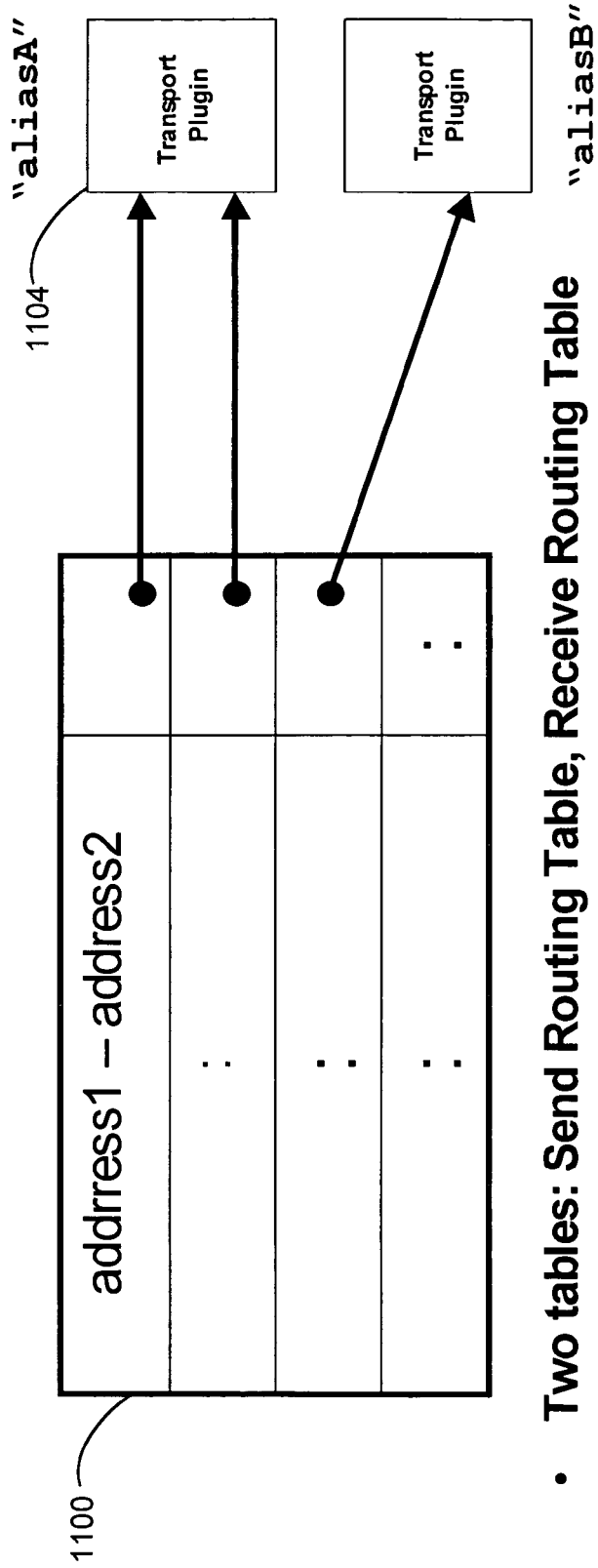
FIG. 11 is a schematic view of a routing table.

A Discovery QosPolicy is specified on a Domain Participant, and includes fields that specify the transport plugins available for use by the "peer discovery" mechanism used by the Domain Participants to exchange information about each other. The Discovery QosPolicy also includes a list of initial peer strings that specify the locator strings for peer participant unicast interfaces (over various transport networks) or multicast locator strings. This field can be used to configure the physical discovery and startup topology of a data distribution system. The information exchanged among Domain Participants during the "peer discovery" includes information about their endpoints and the locators at which their endpoints can receive messages. For example, a Domain Participant may specify that it has three Data Writers on two different topics and the locators over which each a Data Writer is able to receive acknowledgements, while another Domain Participant may specify that it has two Data Readers on one topic and the locators on which each Data Reader is able to receive incoming messages. Once the Domain Participants exchange their locators, they can determine if they have compatible Data Readers and Data Writers that can communicate over a common transport network; once a match is established the Data Writer and the Data Reader can communicate with one another over the common transport networks. This scheme supports many different use cases for specifying the traffic flow in a data distribution system. In one embodiment, peer Domain Participants may be discovered over one transport network and but user data may be exchanged over another transport network A Transport Builtin QosPolicy is associated with a Domain Participant to specify the built-in transport plugins that should be automatically created and registered with the Domain Participant on behalf of the user application code. A default value is specified for the Transport Builtin QosPolicy so that the user application code can run "out-of-the-box" without requiring any explicit transport configuration. For the builtin transport plugins, the steps to create a transport plugin, specify aliases, network address, register transport plugin, and add routes steps are automatically performed on behalf of the user application code. The user application code can specify the use of a builtin transport plugin by turning on a corresponding bit in the Transport Builtin Qos Policy A transport plugin registered with a Domain Participant can be restricted to send outgoing messages to a certain sets of address ranges adding "send routes" in a Send Routing Table. A transport plugin registered with a Domain Participant can be restricted to receive incoming messages from a certain sets of address ranges adding "receive routes" in a Receive Routing Table. FIG. 11 is a schematic view of a routing table 1100. Each row in the routing table 1100 lists a range of addresses from address1 to address2. In the example illustrated in FIG. 11 the address range "address1 to address2" is linked to transport plugin with alias "aliasA" 1104. This transport plugin will be used to communicate messages destined for an address in the range "address1 to address2". Several routing table entries may be linked a transport plugin. If a send (or receive) route is not explicitly added to the send (or receive) routing table, a default route is automatically added when the Domain Participant is enabled corresponding to the address range specified by network address associated with the transport plugin when it is registered with the Domain Participant. The send and the receive routing tables may be used to restrict communication within certain address boundaries, often important to ensure privacy and security of messages.

Figure 8:
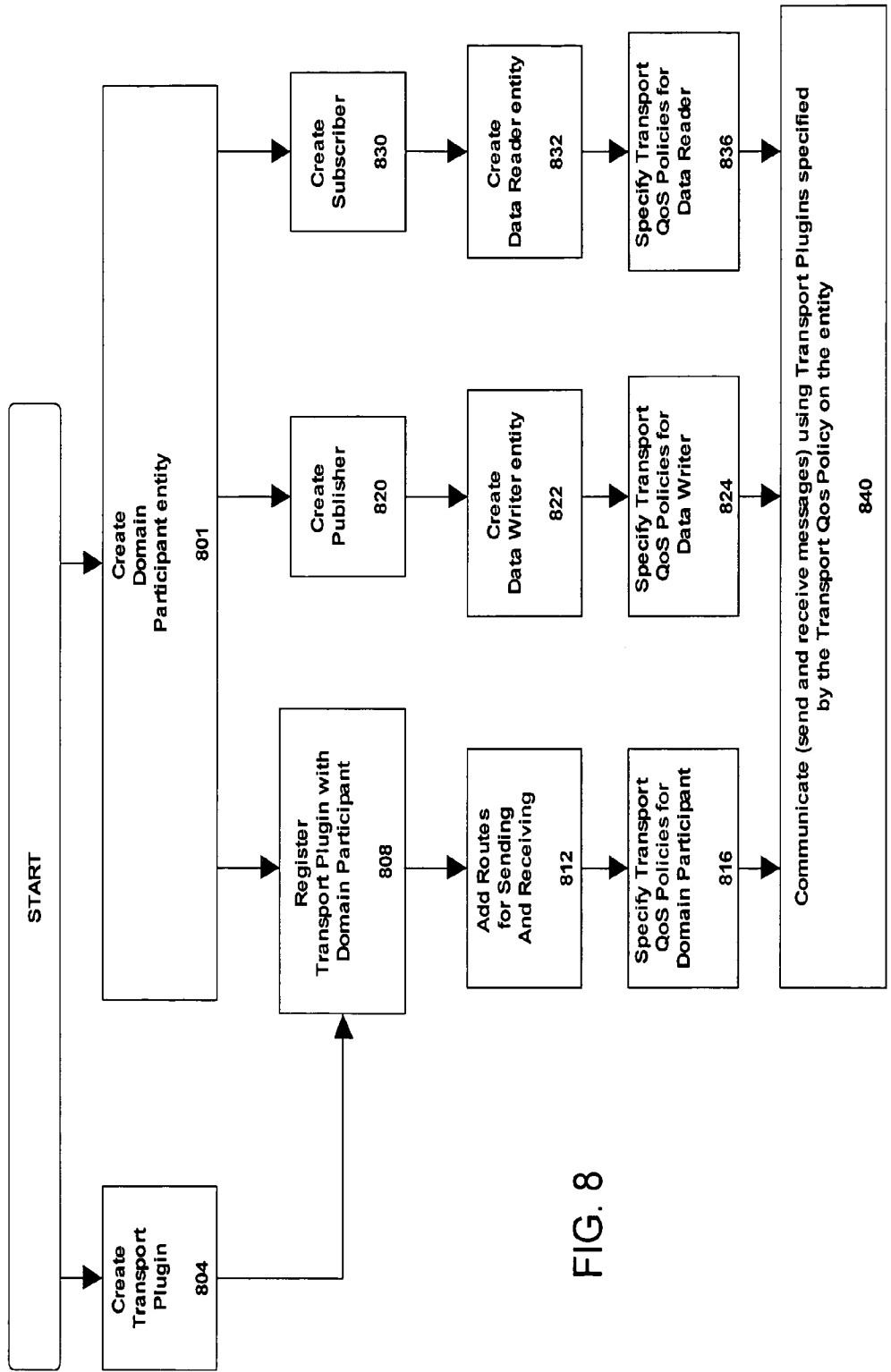
FIG. 8 is a flow chart of a process for creating, registering, and using a transport plugin.

FIG. 8 is a flow chart of a process for creating, registering, and using a transport plugin. A Domain Participant and a transport plugin are created (steps 801 and 804). The transport plugin is created as an instance of a transport plugin class which implements the methods specified by the transport API 320. The transport plugin is registered with the Domain Participant (step 808). The Domain Participant gets exclusive use of the transport plugin; a transport plugin should not be registered with more than one Domain Participant. The registering of the transport plugin associates the transport plugin with a network address, and a list of aliases. After a transport plugin is registered with a Domain Participant, routes are added (step 812) for outgoing and incoming messages in the Send Routing Table and the Receive Routing Table respectively. The Transport QoS policies associated with a Domain Participant (see FIG. 7) are specified (step 816), and refer to transport plugins using the aliases. The Domain Participant can then start using the Transport Plugins specified by the aliases in the associated Transport QoSPolicies, to send and receive messages 840. To produce data on a topic, first a Publisher is created from a Domain Participant (step 820). From the Publisher a Data Writer is created for a Topic (step 822). The Transport Qos Policies associated with a Data Writer (see FIG. 7) are specified (step 824). The Data Writer can then start using the Transport Plugins specified by the aliases in the associated Transport QoSPolicies, to send and receive messages (step 840). To consume data published on a topic, first a Subscriber is created (step 830) from a Domain Participant. From the Subscriber a Data Reader is created for a Topic. The Transport Qos Policies associated with a Data Reader (see FIG. 7) are specified (step 836). The Data Reader can then start using the Transport Plugins specified by the aliases in the associated Transport QoSPolicies, to send and receive messages (step 840).

Figure 9:
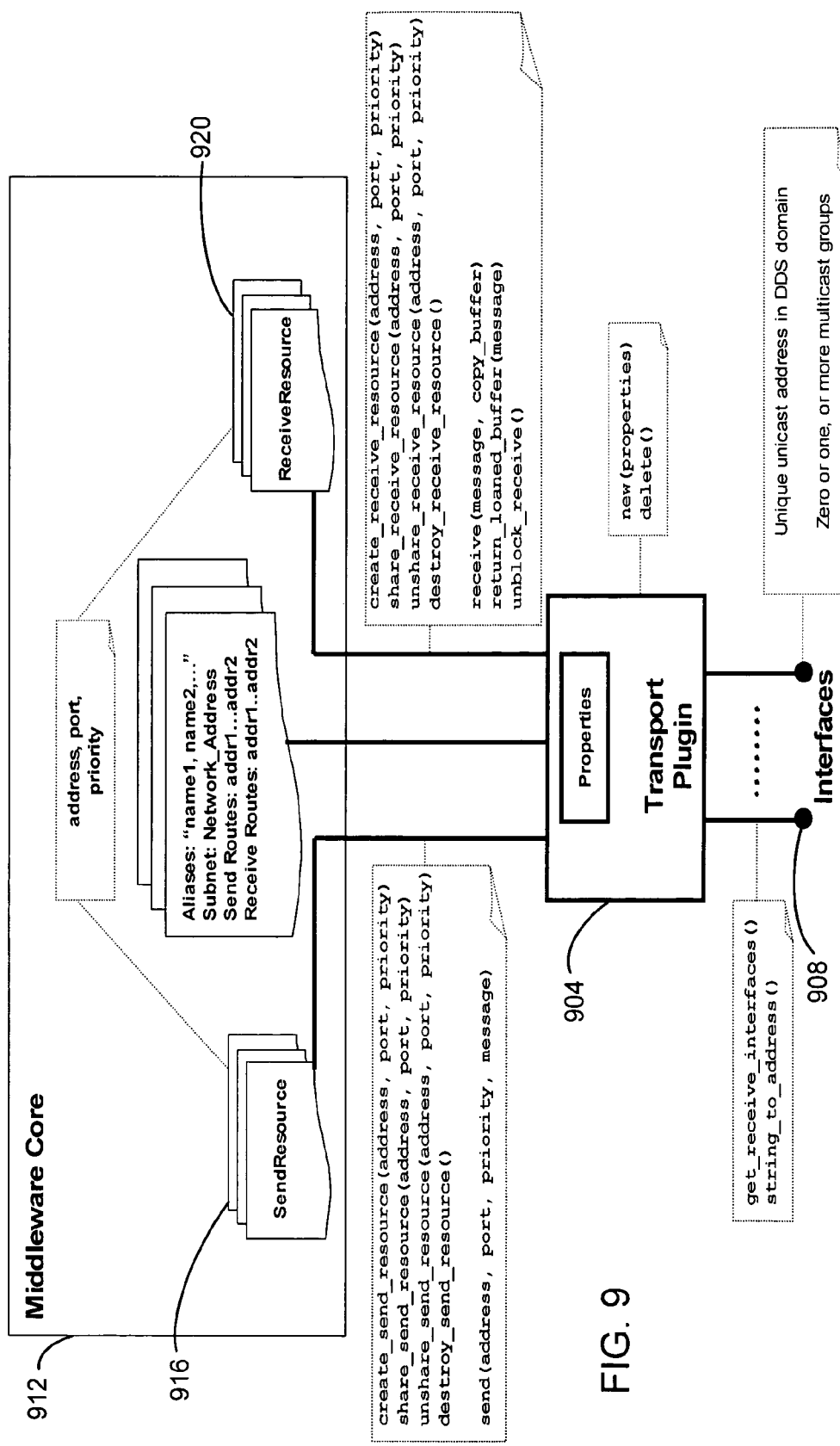
FIG. 9 is a schematic view of a transport plugin architecture including the transport API.

FIG. 9 is a schematic view of a transport plugin architecture including the transport API 320 that must be implemented by a transport plugin. A transport plugin has attributes that are class invariant such as the class id, the address bit count, and the class name. A transport plugin also specifies attributes that may vary from one instance to another. These include the maximum message size that can be communicated by the transport plugin in a single operation, and the maximum number of buffers it can assemble into a message to send, the maximum number of ports that can be open within the plugin, the specific range of port numbers, a mapping from logical priorities specified on the transport-plugin send operation to the priorities supported by the underlying transport (e.g. TOS field for Ipv4 or Ipv6), etc. Generally, the transport plugin properties would also include fields for sizing the internal buffers and parameters used by the transport plugin implementation. A transport plugin 904 has a plurality of interfaces 908 (also see FIG. 3). A set of transport specific properties can be specified in the constructor of transport plugin, for example a new (properties) method. The transport plugin properties may instruct a transport plugin to mask out some interfaces, thus effectively not utilizing them for communication via that transport plugin, or it may even explicitly list the address(es) of the interface(s) that should be used to exchange messages by the transport plugin. The available, allowed or unmasked interfaces 908 are reported to the Middleware core 912, for example via a get_receive_interfaces( )method. A transport plugin provides a destructor, for example the delete( ) operation. As discussed previously, a transport plugin also provides a method for converting a transport specific address string representation into a transport independent numeric representation that can be used as part of the locator information exchanged between communicating Domain Participants. This is shown as the string_to_address( )method in FIG. 9.

The Middleware Core maintains the aliases, network_address, the send routes, and the receive routes associated with a transport plugin (FIG. 9). These are used by the Middleware core to determine the transport plugin(s) used to communicate with other nodes using one or more transport networks.

The notion of a transport "Resource" is used in the methods used to send and receive messages. A Send Resource (or Receive Resource) represents a transport specific object that can be used to send (or receive) messages. The Middleware core 912 asks a transport plugin 904 to create a Send Resource (or a Receive Resource), for example by invoking the create_send_resource( ) or create_receive_resource( )methods. The Send Resources 916 or Receive Resources 920 can be thought of a cookies that the Transport Plugin 904 creates and understands, but that are opaque to the Middleware core 912. The Middleware core 912 keeps and manages the Send Resources 916 and Receive Resources 920 on behalf of the transport plugins. When the Middleware core 912 needs to use a transport plugin 904 to send a message to a particular locator, the Middleware core 912 uses the Send Resource associated with that locator with the send( )method provided by the transport plugin 904. When the Middleware core 912 needs to use a transport plugin 904 to receive a message on a port number (or multicast group address and a port number), the Middleware core 920 uses a Receive Resource 920 to receive messages on that port number (and multicast group address). The Middleware core can create a separate receive thread per Receive Resource to wait for incoming messages. The receive( )method on the transport plugin retrieves the messages received on a Receive Resource 912. The transport plugin may copy the incoming message into a buffer provide by the caller or loan an internal transport plugin buffer to the caller; in the latter case the loaned transport plugin buffer must be returned to the caller, for example using the return_loaned_buffer( )method. A thread waiting for incoming messages on a Receive Resource may be unblocked by calling an unlock operation, for example the unblock_receive( )method.

The transport resources (Send Resources or Receive Resources) are associated with an address, a port number, and a transport priority used for communicating messages. The transport resources are pre-created by the Middleware core as soon as the need to send to an address and port number is determined, or the need to receive from a port number (or multicast group address) is determined. Thus, the overhead of creating or setting up resources is eliminated in the critical data path of incoming or outgoing messages. This helps mitigate the end-to-end latency and makes the operations of sending or receiving messages more predictable; both key considerations for a real-time middleware implementation. A transport resource may be associated or "shared" for use with several (address, port, priority) combinations. A transport plugin provides methods for creating, sharing, and unsharing a resource for a (address, port, priority) combination, and methods for deleting resources. The Middleware core uses these methods to manage transport (send and receive) resources.

Figure 10:
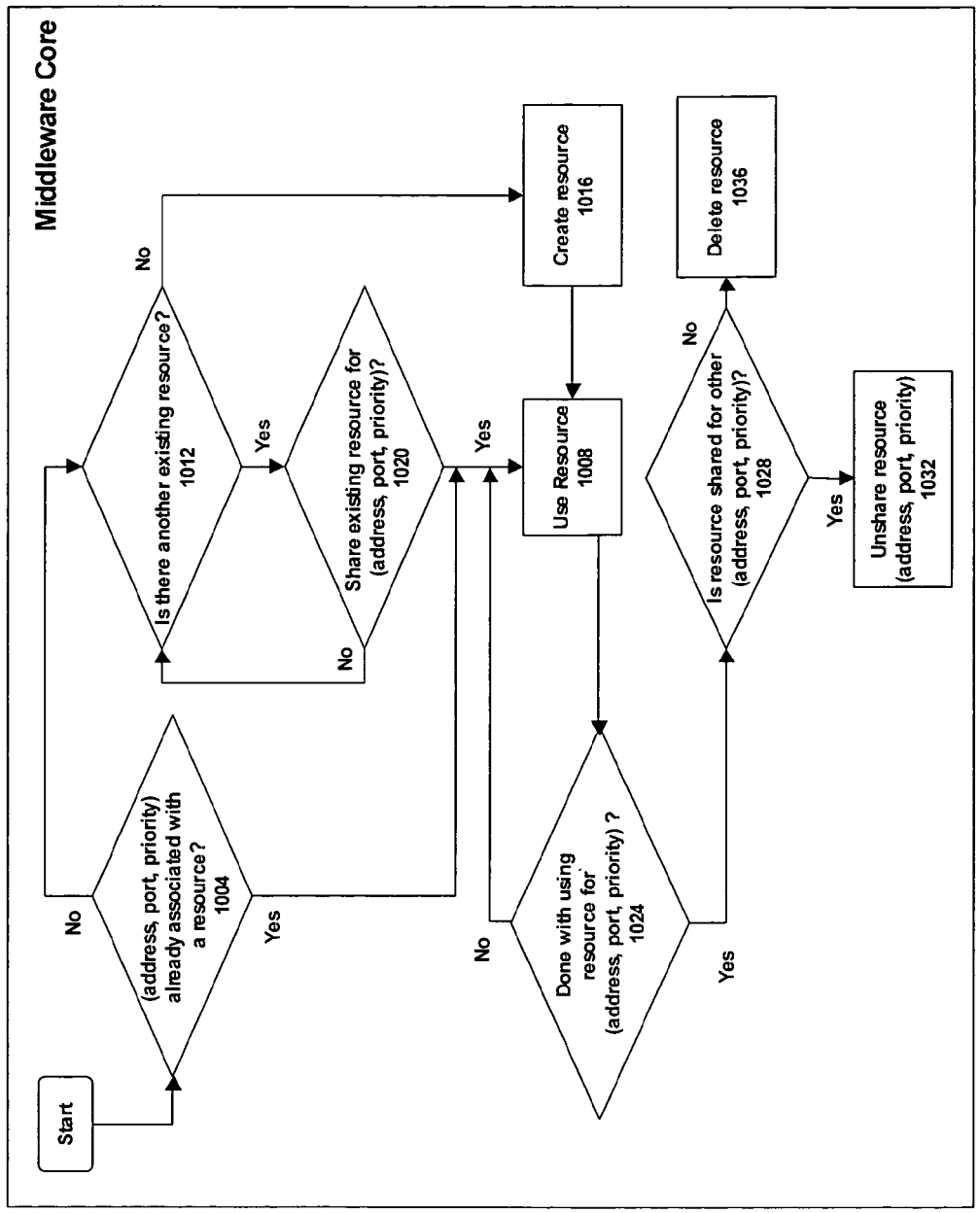
FIG. 10 is a high level flow chart illustrating how transport resources are used by the Middleware core.

FIG. 10 is a high level flow chart illustrating how transport resources are used by the Middleware core. The pattern illustrated here applies to both Send Resources and Receive Resources. Given an (address, port, priority) combination, the Middleware core first determines whether there is any associated resource (step 1004). If so, that resource is used (step 1008). Otherwise, the middleware core determines if there are any existing resources created by the transport plugin that it is currently managing on behalf of the transport plugin (step 1012). If there are no such resources, a new transport resource is created associated with that (address, port, combination) (step 1016). Otherwise, for each pre-existing resource the middleware core will ask the transport plugin if can share the resource for the desired (address, port, priority) by calling a share_*_resource( )method (here * may be either send or receive) (step 1020). If the answer is yes for a preexisting resource, then the new (address, port, priority) is associated with it, and it is used by the middleware (step 1008). If none of the preexisting resources can be used for the (address, port, priority), a new resource is created by calling the create_*_resource( )method (step 1016). After the middleware core is done using a resource for an (address, port, priority) (step 1024), it determines whether the resources shared for other (address, port, priority) combinations or not (step 1028). If there are other (address, port, priority) combinations associated with the resource, its unshared for the (address, port, priority) combination that is no longer needed by calling the unshare_*_resource( )method (step 1032). Otherwise the resource is deleted by calling the delete_*_resource( )method (step 1036).

Besides precreation and optimization of both the data path and the resources used, this scheme has several advantages. A key one being that it allows the transport plugin to be in control and determine how to implement the notion of a resource. The transport plugin has to determine if it can support multicast messages and how to join and leave a multicast group. For example, a transport plugins may join a multicast group address in the share_*_resource( )method, and leave the multicast group in the unshare_*_resource( )method. Another example is when a transport plugin can determine whether a resource may be used for a range of addresses or if different resources are needed for different addresses. Generally, send resources that need to establish a connection cannot be shared, because they are required for maintaining the connection, whereas connection-less resources are more often shared. For example, in a connection oriented transport, a send resource cannot be shared for more than one (address, port) combination, whereas for a connection-less transport, a send resource could potentially be send to any (address, port) in that transport network.

The transport plugin architecture described above enables improved security in a data distribution system from a user application code point of view. Improved security can be achieved using a secure transport plugin—for example one that encrypts messages. Since the secure encryption is performed in the transport plugin and not in the operating system, this scheme can potentially be more secure, as there is a smaller chance of intrusion or snooping by other code executing on the operating system. Furthermore, routes can be added to the Domain Participant to restrict the data distribution message traffic to authorized sub-networks.

Figure 13:
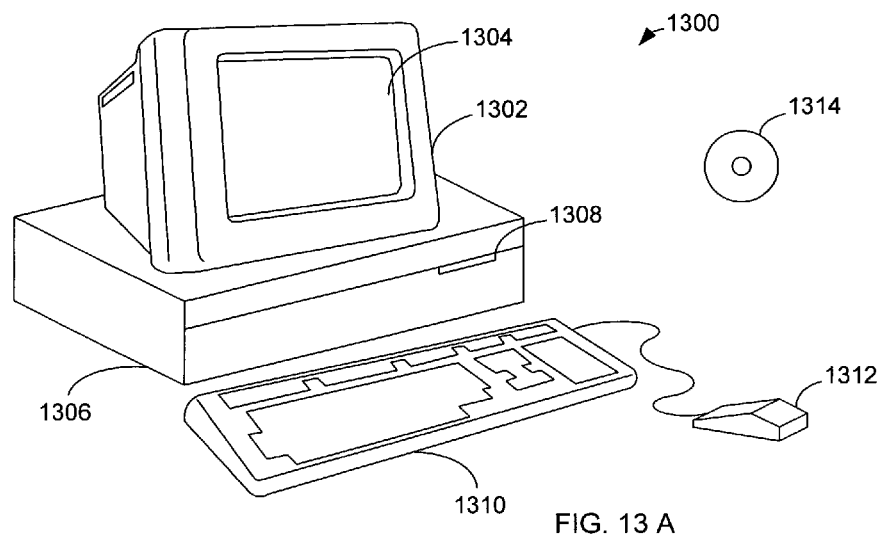
FIGS. 13 A-B illustrate a computer system, which is suitable for implementing an embodiment of the present invention.
Figure 13:
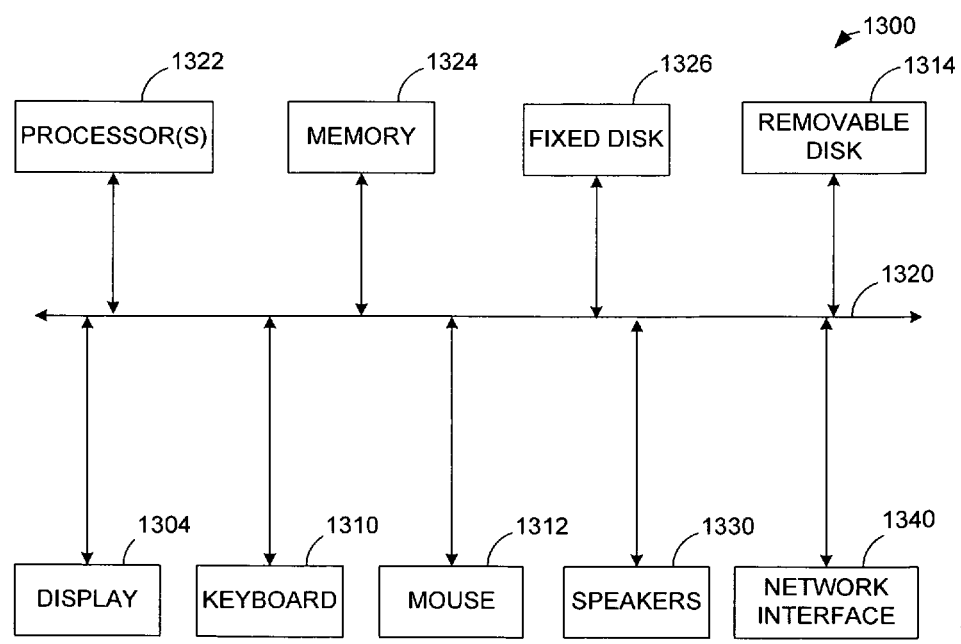

FIGS. 13A and 13B illustrate a computer system 1300, which is suitable for implementing embodiments of the present invention. FIG. 13A shows one possible physical form of the computer system. Of course, the computer system may have many physical forms ranging from an integrated circuit, a printed circuit board, and a small handheld device up to a huge super computer. Computer system 1300 includes a monitor 1302, a display 1304, a housing 1306, a disk drive 1308, a keyboard 1310, and a mouse 1312. Disk 1314 is a computer-readable medium used to transfer data to and from computer system 1300.

FIG. 13B is an example of a block diagram for computer system 1300. Attached to system bus 1320 is a wide variety of subsystems. Processor(s) 1322 (also referred to as central processing units, or CPUs) are coupled to storage devices, including memory 1324. Memory 1324 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 1326 is also coupled bi-directionally to CPU 1322; it provides additional data storage capacity and may also include any of the computer-readable media described below. Fixed disk 1326 may be used to store programs, data, and the like and is typically a secondary storage medium (such as a hard disk) that is slower than primary storage. It will be appreciated that the information retained within fixed disk 1326 may, in appropriate cases, be incorporated in standard fashion as virtual memory in memory 1324. Removable disk 1314 may take the form of any of the computer-readable media described below.

CPU 1322 is also coupled to a variety of input/output devices, such as display 1304, keyboard 1310, mouse 1312, and speakers 1330. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 1322 optionally may be coupled to another computer or telecommunications network using network interface 1340. With such a network interface, it is contemplated that the CPU might receive information from the network, or might output information to the network in the course of performing the above-described method steps. Furthermore, method embodiments of the present invention may execute solely upon CPU 1322 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor.

While this invention has been described in terms of several preferred embodiments, there are alterations, modifications, permutations, and various substitute equivalents, which fall within the scope of this invention. It should also be noted that there are many alternative ways of implementing the methods and apparatuses of the present invention. It is therefore intended that the following appended claims be interpreted as including all such alterations, modifications, permutations, and various substitute equivalents as fall within the true spirit and scope of the present invention.

What is claimed is:

1. A method of providing transports for an Object Management Group's (OMG) Data Distribution Service middleware implementation operating over a plurality of transports in a data distribution system, the method comprising:
    creating a domain participant in a peer to peer network of computer systems in the OMG Data Distribution Service middleware on the data distribution system;
    creating a transport plugin for the domain participant in the OMG Data Distribution Service middleware on the data distribution system;
    using an application programming interface (API) to register the transport plugin to be used by the Data Distribution Service middleware and the domain participant;
    using the API provided by the transport plugin from the Data-Distribution Service middleware to configure the transport and the resources used by the transport to communicate on a specific transport network;
    using the API provided by the transport plugin from the Data-Distribution Service middleware to send data via the transport; and
    using the API provided by the transport plugin from the Data-Distribution Service middleware to receive data via the transport.

2. The method, as recited in claim 1, further comprising:
    providing an OMG Data Distribution Service middleware implementation with a pluggable transport layer; and
    providing a plurality of transport plugins in the transport layer, wherein each transport plugin with unicast support uses a locator comprising a transport class id, a subnet identifier, transport address, and port number, wherein the subnet identifier is transport independent and the transport address is transport specific and meaningful only with in the transport network.

3. The method as recited in claim 2, further comprising providing a plurality of transport plugins in the transport layer, wherein each transport plugin with multicast support uses a locator comprising a transport class id, and a multicast address, and port number wherein the multicast address is transport independent.

4. The method, as recited in claim 3, wherein the plurality of transport networks comprises shared memory, IPv6 networks, and IPv4 networks.

5. The method, as recited in claim 4, wherein the plurality of transport networks further comprises serial interconnect networks and bus-based networks.

6. The method, as recited in claim 1, further comprising:
    using the API provided by the transport plugin to send commands from the OMG Data Distribution Service middleware to the plurality of transport plugins to create send resources and receive resources;
    using the API provided by the transport plugin to create the send resources and receive resources before the resources are needed;
    keeping and managing the send resources and receive resources in the data distribution middleware core; and
    using the API provided by the transport plugin to send requests from the OMG Data Distribution Service middleware to the plurality of transport plugins to share the send resources and receive resources.

7. The method, as recited in claim 6, further comprising sharing the send resources and receive resources for multiple addresses and port numbers, wherein each transport plugin independently decides whether or not to share a send resource or a receive resource for a given address and port number.

8. The method, as recited in claim 7, wherein the transport plugin can decide whether to copy a received message into a buffer provided by the middleware core or whether to loan an internal buffer provided by the transport plugin.

9. The method, as recited in claim 6, wherein a transport plugin determines the interfaces on which it can receive messages.

10. The method, as recited in claim 9, further comprising allowing a user to direct a transport plugin to not report specified interfaces.

11. The method, as recited in claim 6, further comprising allowing a transport plugin decide resources needed to send and receive messages.

12. The method, as recited in claim 1, further comprising:
    providing a sending routing table to specify the address ranges served by a transport plugin for outgoing messages; and
    providing a receiving routing table to specify the address ranges served by a transport plugin for incoming messages.

13. The method, as recited in claim 12, wherein the sending routing table links address ranges with the transport plugins by specifying the address ranges served by a transport plugin for outgoing messages.

14. The method, as recited in claim 13, further comprising providing encryption in the plurality of transport plugins.

15. The method, as recited in claim 1, further comprising assigning aliases to each of the transport plugins of the plurality of transport plugins.

16. The method, as recited in claim 15, wherein at least one of the transport plugins of the plurality of transport plugins has a plurality of aliases.

17. The method, as recited in claim 16, wherein at least one of the aliases is assigned to a plurality of transport plugins of the plurality of transport plugins.

18. The method, as recited in claim 1, further comprising:
    providing a string based addressing, wherein the string based addressing comprises a transport independent substring and a transport dependent substring; and
    translating the string based addressing to a numeric address representation using an address mapping method provided by the transport plugin.

19. The method, as recited in claim 1, further comprising:
    providing built in transport plugins that are automatically registered on the Domain Participant; and
    generating default network addresses for the built in transport plugins.

20. The method, as recited in claim 1, wherein the registration involves specifying network address and aliases.

21. The method, as recited in claim 20, wherein the network address is chosen so that the unicast address of an interface (including the network address, transport address) is unique in the data distribution domain.

22. The method, as recited in claim 20, further comprising allowing a user to direct a transport plugin to not report specified interfaces.

23. A method of providing transports for an Object Management Group's (OMG) Data Distribution Service middleware operating over a plurality of transports in a data distribution system, the method comprising:
providing an OMG Data Distribution Service middleware with a pluggable transport layer in the data distribution system in a peer to peer network of computer systems;
providing a plurality of transport plugins in the transport layer in the data distribution system wherein each individual transport plug-in is configured to communicate on a specific transport network; and
assigning aliases to each of the transport plugins of the plurality of transport plugins, wherein at least one of the transport plugins of the plurality of transport plugins has a plurality of aliases.

24. The method, as recited in claim 23, wherein at least one alias refers to plurality of transport plugins.

25. The method, as recited in claim 23, wherein at least one of the aliases is assigned to a plurality of transport plugins of the plurality of transport plugins.

26. The method, as recited in claim 23, further comprising:
creating a plurality of OMG Data Distribution Service entities, such as domain participants, publishers, subscribers, data writers and data readers; and
associating the Transport Qos Policies with the OMG Data Distribution Service entities, wherein Transport QosPolicies use aliases to refer to a plurality of transport plugins.

27. A method of providing transports for a data distribution middleware over a plurality of transport networks in an OMG Data Distribution Service in a data distribution system, the method comprising:
providing an OMG Data Distribution Service middleware with a pluggable transport layer in the data distribution system in a peer to peer network of computer systems;
providing a plurality of transport plugins in the data distribution system wherein each individual transport plug-in is configured to communicate on a specific transport network;
providing a plurality of domain participants; and
associating the plurality of transport plugins with the plurality of domain participants.

28. The method, as recited in claim 27 further comprising:
providing routing of messages to the plurality of transport plugins in the plurality of domain participants; and
providing encryption using a plurality of transport plugins in the plurality of domain participants.

29. A method for creating transport plugins in an Object Management Group's (OMG) Data Distribution Service middleware, comprising:
using an application programming interface (API) to send commands from the OMG Data Distribution Service middleware on a data distribution system in a peer to peer network of computer systems to a plurality of transport plugins to create send resources and receive resources wherein each individual transport plug-in is configured to communicate on a specific transport network;
creating the send resources and receive resources before the resources are needed;
keeping and managing the send resources and receive resources in the data distribution middleware core; and
using the API to send requests from the data distribution middleware to the plurality of transport plugins to share the send resources and receive resources.

30. The method, as recited in claim 29, further comprising sharing the send resources and receive resources for multiple addresses and port numbers, wherein each transport plugin independently decides whether or not to share a send resource or a receive resource for a given address and port number.

31. The method, as recited in claim 29, wherein a transport plugin determines the interfaces on which it can receive messages.

32. The method, as recited in claim 29, further comprising allowing a transport plugin decide the resources needed to send and receive messages.

33. Non-transitory computer readable media for providing transports for an OMG Data Distribution Service middleware implementation over a plurality of transport networks, comprising:
computer readable code for creating a domain participant in a peer to peer network of computer systems;
computer readable code for creating a transport plugin for the domain participant;
computer readable code with application programming interfaces (APIs) for registering the transport plugin with the domain participant;
computer readable code with APIs provided by the transport plugin from the Data-Distribution Service middleware to configure the transport and the resources used by the transport to communicate on a specific transport network;
computer readable code with APIs provided by the transport plugin from the Data-Distribution Service middleware to send data via the transport; and
computer readable code with APIs provided by the transport plugin from the Data-Distribution Service middleware to receive data via the transport.

34. The non-transitory computer readable media, as recited in claim 33, further comprising:
computer readable code for providing an OMG Data Distribution Service middleware implementation with a pluggable transport layer; and
computer readable code providing a plurality of transport plugins in the transport layer, wherein each transport plugin with unicast support uses a locator comprising a transport class id, a subnet identifier, transport address, and port number, wherein the subnet identifier is transport independent and the transport address is transport specific and meaningful only with in the transport network.

35. The computer readable media as recited in claim 34, further comprising computer readable code for providing a plurality of transport plugins in the transport layer, wherein each transport plugin with multicast support uses a locator comprising a transport class id, and a multicast address, and port number wherein the multicast address is transport independent.

36. The computer readable media, as recited in claim 35, wherein the plurality of transport networks comprises shared memory, IPv6 networks, and IPv4 networks.

37. Non-transitory computer-readable media comprising readable code for providing transports for an OMG Data Distribution Service middleware over a plurality of transport networks, comprising:
computer readable code for providing an OMG Data Distribution Service middleware with a pluggable transport layer in a peer to peer network of computer systems;

computer readable code for providing a plurality of transport plugins in the transport layer wherein each individual transport plug-in is configured to communicate on a specific transport network; and computer readable code for assigning aliases to each of the transport plugins of the plurality of transport plugins, wherein at least one of the transport plugins of the plurality of transport plugins has a plurality of aliases.

38. The non-transitory computer readable media, as recited in claim 37, wherein at least one alias refers to plurality of transport plugins.

39. The non-transitory computer readable media, as recited in claim 37 wherein at least one of the aliases is assigned to a plurality of transport plugins of the plurality of transport plugins.

40. The non-transitory computer readable media, as recited in claim 37, further comprising:

computer readable code for creating a plurality of OMG Data Distribution Service entities, such as domain participants, publishers, subscribers, data writers and data readers; and computer readable code for associating the Transport Qos Policies with the OMG Data Distribution Service entities, wherein Transport QosPolicies use aliases to refer to a plurality of transport plugins.

41. Non-transitory computer readable media for providing transports for an OMG Data Distribution Service middleware over a plurality of transport networks, comprising:

computer readable code for providing a data distribution middleware with a pluggable transport layer in a peer to peer network of computer systems;

computer readable code for providing a plurality of transport plugins wherein each individual transport plug-in is configured to communicate on a specific transport network;

computer readable code for providing a plurality of domain participants; and computer readable code for associating the plurality of transport plugins with the plurality of domain participants.

42. The non-transitory computer readable media, as recited in claim 41, further comprising:

computer readable code for providing routing of messages to the plurality of transport plugins in the plurality of domain participants; and computer readable codes for providing encryption using a plurality of transport plugins in the plurality of domain participants.

43. Non-transitory computer readable media for creating transport plugins, comprising:

computer readable code containing an application programming interface (API) used to send commands from an OMG Data Distribution Service middleware to a plurality of transport plugins to create send resources and receive resources in a peer to peer network of computer systems wherein each individual transport plug-in is configured to communicate on a specific transport network;

computer readable code containing an API to a transport plugin for creating the send resources and receive resources before the resources are needed;

computer readable code for a transport plugin for keeping and managing the send resources and receive resources in the OMG Data Distribution Service middleware; and computer readable code containing an API for sending requests from the data distribution middleware to the plurality of transport plugins to share the send resources and receive resources.

44. The non-transitory computer readable media, as recited in claim 43, further comprising computer readable code for sharing the send resources and receive resources for multiple addresses and port numbers, wherein each transport plugin independently decides whether or not to share a send resource or a receive resource for a given address and port number.

* * * * *